US012508507B2

(12) United States Patent
Ochi

(10) Patent No.: US 12,508,507 B2
(45) Date of Patent: Dec. 30, 2025

(54) COMPUTER SYSTEM, GAME SYSTEM, AND GAME MEDIUM CONTROL METHOD

(71) Applicant: BANDAI NAMCO ENTERTAINMENT INC., Tokyo (JP)

(72) Inventor: Hiroaki Ochi, Tokyo (JP)

(73) Assignee: BANDAI NAMCO ENTERTAINMENT INC., Tokyo (JP)

( * ) Notice: Subject to any disclaimer, the term of this patent is extended or adjusted under 35 U.S.C. 154(b) by 415 days.

(21) Appl. No.: 17/897,837

(22) Filed: Aug. 29, 2022

(65) Prior Publication Data

US 2022/0410008 A1 Dec. 29, 2022

Related U.S. Application Data

(63) Continuation of application No. PCT/JP2021/013560, filed on Mar. 30, 2021.

(30) Foreign Application Priority Data

Mar. 31, 2020 (JP) ................................ 2020-063328

(51) Int. Cl.
*A63F 13/00* (2014.01)
*A63F 13/56* (2014.01)
*A63F 13/67* (2014.01)

(52) U.S. Cl.
CPC .............. *A63F 13/56* (2014.09); *A63F 13/67* (2014.09)

(58) Field of Classification Search
CPC ................................ A63F 13/56; A63F 13/67
See application file for complete search history.

(56) References Cited

U.S. PATENT DOCUMENTS

2015/0141141 A1 5/2015 Suzuki et al.
2015/0151204 A1 6/2015 Yamaguchi et al.
2019/0060763 A1* 2/2019 Arai ........................ A63F 13/79

FOREIGN PATENT DOCUMENTS

JP 2004-073681 A 3/2004
JP 2013-226272 A 11/2013
JP 2014-176716 A 9/2014
JP 2015-107216 A 6/2015
JP 2017-196116 A 11/2017
JP 2019-170998 A 10/2019

OTHER PUBLICATIONS

Jun. 22, 2021 International Search Report issued in Patent Application No. PCT/JP2021/013560.

* cited by examiner

*Primary Examiner* — Dmitry Suhol
*Assistant Examiner* — Jason Pinheiro
(74) *Attorney, Agent, or Firm* — Oliff PLC

(57) ABSTRACT

A first-type game medium, a second-type game medium, and a third-type game medium are associated with a common character. The first-type game medium can be obtained by performing composition using a specific combination of game media. The second-type game medium cannot be obtained by composition of game media. A first specific material game medium and a second specific material game medium can be obtained by decomposing the first-type game medium. The first specific material game medium and the second specific material game medium can also be obtained by decomposing the second-type game medium. The third-type game medium can be obtained by performing composition using the specific combination of game media and the first specific material game medium or the second specific material game medium.

12 Claims, 23 Drawing Sheets

COMPUTER SYSTEM, GAME SYSTEM, AND GAME MEDIUM CONTROL METHOD

CROSS REFERENCE TO RELATED APPLICATION

This application is a continuation of International Patent Application No. PCT/JP2021/013560, having an international filing date of Mar. 30, 2021, which designated the United States, the entirety of which is incorporated herein by reference. Japanese Patent Application No. 2020-063328 filed on Mar. 31, 2020 is also incorporated herein by reference in its entirety.

BACKGROUND

There are known games in which a large number of types of game media such as characters and items appearing in the game is prepared to be used in the game and is granted to players as appropriate in accordance with the progress of the game. For example, in a sports game in which a plurality of athletes trained by players is selected to form teams and the teams play sports, one type of the game media is the athlete characters. As another example, in a role playing game (RPG) in which player characters are equipped with items reinforced by players, game media are the items worn or used by the characters. As still another example, in a war simulation game in which players battle against each other with robot weapons developed and reinforced in the game world, game media are the robot weapons and their accessories.

In many cases, the game media are trained, developed, or reinforced by a "composition function" (for example, refer to Japanese Unexamined Patent Application Publication No. 2014-176716 and Japanese Unexamined Patent Application Publication No. 2013-226272).

The "composition function" is a function of compositing a plurality of game media set as materials for composition into one game medium to be a composition result (including the case where one game medium is composed of a plurality of media). Using the composition function trains and reinforces the game media as a base of composition. It can also be said that a new game medium is generated by composition because the game medium is different from the original game media.

In a game in which a wide variety of types of game media is prepared and is newly granted to players in accordance with the progress of the game, making a collection of game media has great significance as one sort of game enjoyment. In other words, in many cases, obtaining favorable game characters and items, that is, making a collection of such characters and items for gameplay, is a motivation for players to continue gameplay. In addition, in a pay-to-play game or free-to-play game, it is important how long players continue the game.

If a wide variety of types of game media includes a plurality of game media preferred by players, there is a high possibility that the players continue gameplay until they obtain all the media. However, if the game media preferred by players are small in number, the players may get tired of the game in a short period. Nevertheless, the issue may not be solved so simply by increasing the number of game media preferred by players in order to motivate them to continue the game for a longer time.

As it is necessary to prepare a large number of villains in order to enhance the presence of a hero, there is the need to prepare a large number of types of game media expected to be less popular (from another view, low-rarity types) in order to show up a small number of popular types of game media (from another view, high-rarity types many players desire). In particular, this tendency is strong in games based on original works such as comics and animations. Simply increasing the number of game media preferred by players involves preparing many times more game media of types estimated to be less popular. Although it is a rough estimation, there is no great difference between a popular-type game medium and a possibly less popular-type game medium in man-hours and costs of game development necessary for one type of the game medium to appear in the game. Thus, simply increasing the number of game media preferred by players cannot be said to be a good plan because it is necessary to develop game media estimated to be less popular with many times more man-hours and costs.

From the standpoint of a player, the rarity of popular-type game media preferred by many players is high, and consequently, the player tends to consume resources such as play times and play costs until he/she obtains desired game media. Until after obtaining desired game media, the player will be continuously granted new game media (meaning game media newly usable by the player) in accordance with the progress of the game, but such granted game media are more likely to be less popular, undesired game media. It may often seems to the player that the game media of undesired types symbolizes a waste of resources, and an accumulation of those game media may stimulate the player to stop gameplay.

DESCRIPTION OF EXEMPLARY EMBODIMENTS

Figure 1:
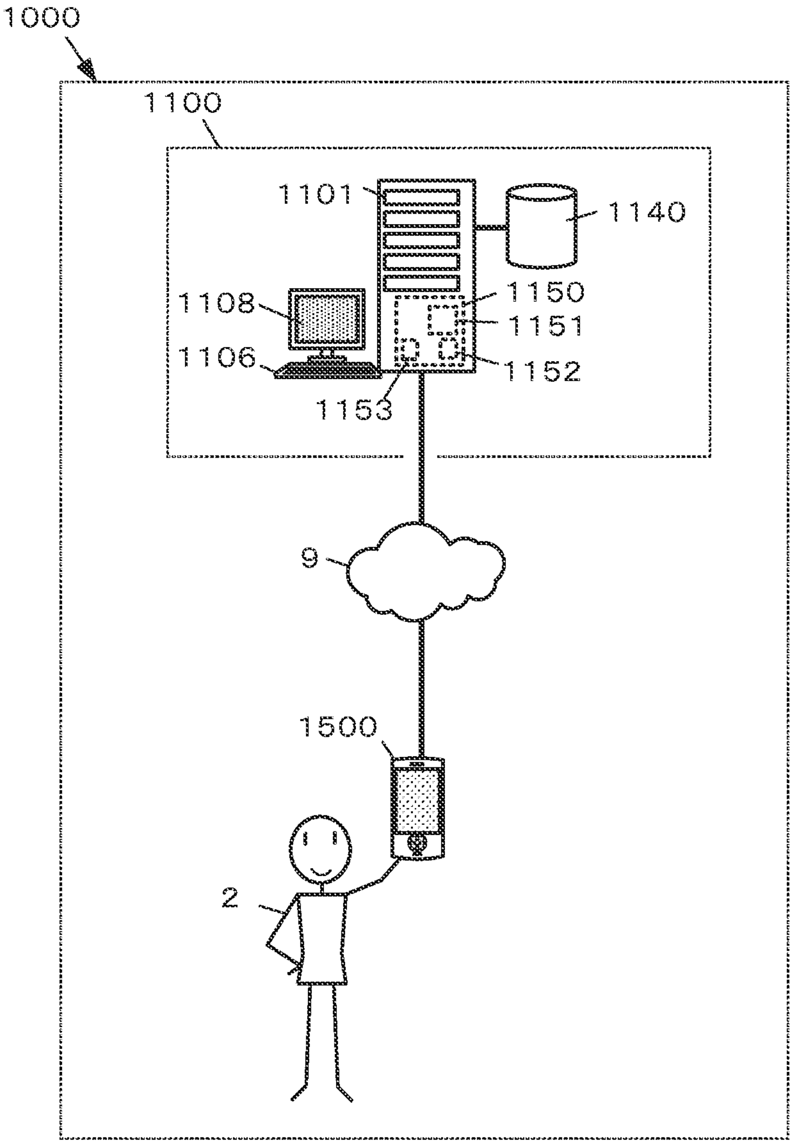
FIG. 1 is a diagram illustrating a configuration example of a game system.

The following disclosure provides many different embodiments, or examples, for implementing different features of the provided subject matter. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. Further, when a first element is described as being "connected" or "coupled" to a second element, such description includes embodiments in which the first and second elements are directly connected or coupled to each other, and also includes embodiments in which the first and second elements are indirectly connected or coupled to each other with one or more other intervening elements in between.

A first disclosure is a computer system comprising:

at least one processor or circuit programmed to execute:

controlling execution of a game in which a character uses an associated game medium;

performing a composition control of compositing a plurality of the game media into the one game medium; and performing a decomposition control of decomposing the game medium into a plurality of the game media, wherein

- a first-type game medium, a second-type game medium, and a third-type game medium are associated with a predetermined common character,
- the third-type game medium has a higher ability of the common character exerted at time of use in the game than the first-type game medium,
- the second-type game medium is a game medium incapable of being obtained by composition in the composition control,
- the composition control includes, in a case of performing composition using a specific combination of the game media, outputting the first-type game medium as a composition result,
- the decomposition control includes, in a case of decomposing the first-type game medium, outputting a plurality of game media including a first specific material game medium,
- the decomposition control includes, in a case of decomposing the second-type game medium, outputting a plurality of game media including a second specific material game medium identical to or different from the first specific material game medium, and
- the composition control includes, in a case of performing composition using the game media in the specific combination and the first specific material game medium, or in a case of performing composition using the game media in the specific combination and the second specific material game medium, outputting the third-type game medium as a composition result.

The "computer system" here may be implemented by a single computer or a plurality of computers in cooperation.

The "composition of game media" refers to depriving the right to use a plurality of game media that are composition materials and granting the right to use a game medium of the same type as the materials or of a different type. It seems to the player as if the materials are consumed to generate a composition result.

The "decomposition of game media" refers to, contrary to the composition, depriving the right to use one game medium that is a material in a game and granting the right to use a plurality of game media of types different from the material.

The "character" here refers to a comprehensive entity of game media expressed on the game screen, and may be a person, animal, robot weapon, tool (item or equipment), vehicle, or the like, depending on the content of the game.

According to the disclosure, in some embodiments, in the game in which game media and characters are not in a one-to-one relationship, some special characters having the same appearance are provided with first-type to third-type game media. From the viewpoint of the game media, common characters having the same external features and regarded as the same type are assigned. That is, the relationship between the types of the game media and the types of characters expressed on the game screen include not only a one-to-one relationship but also a many-to-one relationship.

The first-type to third-type game media are different in how to obtain.

That is, the second-type game medium cannot be obtained through composition under composition control, whereas the first-type game medium and the third-type game medium can be obtained through composition by the composition control section. For composition of the third-type game medium, it is necessary to use a specific combination that is a recipe for composition of the first-type game medium, and the first specific material game medium capable of being obtained only by decomposing the first-type game medium or the second specific material game medium capable of being obtained only by decomposing the second-type game medium. In particular, when being used in the game, the third-type game medium exerts higher ability of the common character than the first-type game medium. Thus, the third-type game medium is the game medium the players really would like to obtain. The level of ability can be determined by, for example, parameter values, the presence or absence of skills, or the numbers of skills. The first specific material game medium and the second specific material game medium may be the same game media or different game media.

Assuming that popular characters the players want are common characters associated with the first-type to third-type game media, making a perfect collection of the popular characters requires collecting the first-type to third-type game media through composition and decomposition. As a result, the players need to continue the game for a long time.

Focusing on the man-hours for production related to game media, graphic materials requiring the largest number of man-hours can be used in common or almost in common only with differences in how to obtain. Thus, setting a common character associated with the first-type to third-type game media requires far fewer man-hours than preparing three different characters.

New game media granted in accordance with the progress of the game can be continuously consumed as composition materials for the first-type game medium and the third-type game medium. Conventionally, characters unwanted by the players, if being granted, have been accumulated without being used. In the present disclosure, these characters can be used as materials for obtaining wanted popular characters. Thus, the unwanted type of game media will be no longer a symbol of waste of resources for the players, and the accumulation of these game media will not stimulate the players to decide to stop the game.

According to the disclosure, in some embodiments, in a game in which game media associated with characters can be composited, it is possible to add new game enjoyment and increase a possibility that the players will continue gameplay.

A second disclosure is the computer system, wherein

- the first-type game medium is set with a first-type unique parameter value unique to the first-type game medium,
- the second-type game medium is set with a second-type unique parameter value unique to the second-type game medium,
- the third-type game medium is set with a third-type unique parameter value unique to the third-type game medium,
- the composition control includes, only in a case of performing composition using the first-type game media, outputting a new first-type game medium with improvement in the first-type unique parameter value, as a composition result,
- the composition control includes, only in a case of performing composition using the second-type game media, outputting a new second-type game medium with improvement in the second-type unique parameter value, as a composition result, and
- the composition control includes, only in a case of performing composition using the third-type game media, outputting a new third-type game medium with improvement in the third-type unique parameter value, as a composition result.

According to the disclosure, in some embodiments, the first-type to third-type game media have the first-type to third-type unique parameter values set thereto, respectively. That is, from the viewpoint of the player, the first-type to third-type game media belong to the same character with differences in their respective unique parameter values such as “differences in spec”, “differences in ability”, or “differences in version”, for example. This provides a strong motivation for the players to collect all of the first-type to third-type game media of the common character.

According to the disclosure, in some embodiments, compositing the game media of the same type makes it possible to change the first-type to third-type unique parameter values and grow the first-type to third-type game media. This allows the players to further increases uses for the characters unwanted by the players.

Accordingly, it is possible to add more game enjoyment and further enhance the possibility of the players continuing the game.

A third disclosure is the computer system, wherein the composition control includes, in a case of performing composition using the second-type game medium and the third-type game medium, outputting a fourth-type game medium associated with the common character as a composition result, the fourth-type game medium being capable of executing a second effect associated with the second-type game medium and a third effect associated with the third-type game medium.

According to the disclosure, in some embodiments, in addition to the first-type to third-type game media, the fourth-type game medium associated with the same common character is added. The fourth-type game medium is set such that the fourth-type game medium can be obtained only by compositing the second-type game medium and the third-type game medium as materials. Therefore, making a complete collection of common characters requires further much time and effort so that the player needs to continue the game for a long time.

Focusing on the effects executed when the first-type to fourth-type game media are used in the game, the fourth-type game medium can execute the second and third effects of the second-type game medium and the third-type game medium that are materials for the compositions. In other words, the fourth-type game medium inherits the respective effects executable by the second-type game medium and the third-type game medium.

For the player, the fourth-type game medium is a nearly perfect entity as a top-class common character into which the second-type game medium and the third-type game medium are brought together, and is an entity the player would really like to obtain. Thus, this is a strong incentive for the player to obtain the fourth-type game medium, which provides a motivation to continue the game for a long time.

A fourth disclosure is the computer system, wherein the at least one processor or circuit is further programmed to execute:

- performing a first effect execution control of executing a first effect if the first-type game medium is used in gameplay;
- performing a second effect execution control of executing a second effect different from the first effect if the second-type game medium is used in gameplay; and
- performing a third effect execution control of executing a third effect different from the first effect and the second effect if the third-type game medium is used in gameplay, and (1) executing the first effect if the first specific material game medium is used as a composition material of the third-type game medium, and (2) executing the second effect if the second specific material game medium is used as a composition material of the third-type game medium.

According to the disclosure, in some embodiments, the first-type to third-type game media are different in effect details to be executed, which is a strong incentive for the player to collect all the first-type to third-type game media of the same common character.

Further, when the third-type game medium composed of the first specific material game medium as a material is used in the game, the third-type game medium can execute not only the third effect but also the first effect of the first-type game medium. Still further, when the third-type game medium composed of the second specific material game medium as a material is used in the game, the third-type game medium can execute not only the third effect but also the second effect of the second-type game medium.

That is, the third-type game medium inherits the right to execute the effect of the game medium as a decomposition source of the specific material game medium. To the player, the third-type game medium seems like a more perfect entity as an upper-class common character than the first-type game medium and the second-type game medium. This is a strong incentive for the player to obtain the third-type game medium how much time and effort it may require.

A fifth disclosure is the computer system, wherein the first-type game medium is set with a first effect parameter value for the first effect, the second-type game medium is set with a second effect parameter value for the second effect, the third-type game medium is set with a third effect parameter value for the third effect, the composition control includes, only in a case of performing composition using the first-type game media, outputting a new first-type game medium with improvement in the first effect parameter value, as a composition result, the composition control includes, only in a case of performing composition using the second-type game media, outputting a new second-type game medium with improvement in the second effect parameter value, as a composition result, and the composition control includes, only in a case of performing composition using the third-type game media, outputting a new third-type game medium with improvement in the third effect parameter value, as a composition result.

A sixth disclosure is the computer system, wherein the first to third effects are at least one of play control of a given video, output control of a given sound, and play control of a given character motion.

The "effect parameters" are parameters related to control of effect display inserted in the game. For example, if the effect relates to a video, the scene represented in the video remains unchanged, but the effect parameters apply to the presence or absence of sound effects and BGM, values specifying the types of the sound effects and BGM, the presence or absence of additional indications to be added to the background, values specifying the types of additional indications, and the like. For example, if the effect is a cut-in still image, the effect parameters apply to the size of the cut-in, the speed of the cut-in, the presence or absence of sound effects for the cut-in, values indicating the types of sound effects.

According to the disclosure, in some embodiments, the first-type to third-type game media can be improved in effect parameter values by compositing the game media of the same type as materials. That is, it is possible to enhance game enjoyment by adding growth and completion elements related to the presentation of the effects of the first-type to third-type game media, thereby motivating the player to continue the game for a long time.

A seventh disclosure is the computer system, wherein the first-type game medium is not set with a skill unique to the first-type game medium or is set with a first-type skill and a first-type skill parameter value, the second-type game medium is set with a second-type skill and a second-type skill parameter value unique to the second-type game medium, the third-type game medium is set with a third-type skill and a third-type skill parameter value unique to the third-type game medium, the composition control includes, only in a case of performing composition using the second-type game media, outputting a new second-type game medium with improvement in the second-type skill parameter value as a composition result, and the composition control includes, only in a case of performing composition using the third-type game media, outputting a new third-type game medium with improvement in the third-type skill parameter value as a composition result.

According to the disclosure, in some embodiments, the first-type game medium is not set with a skill unique to the first-type game medium or is set with the first-type skill parameter value for the first-type skill and its control. The second-type and third-type game media are set with skills unique to the second-type and third-type game media and parameters for their controls. That is, it seems to the player that the first-type to third-type game media belong to the common character but are different in "specification", "ability", and "version". Thus, it is possible to strongly motivate the player to collect all the first-type to third-type game media of the common character.

According to the disclosure, in some embodiments, compositing the game media of the same type makes it possible to change the second-type and third-type unique skill parameter values and grow the second-type and third-type game media. Accordingly, it is possible to add more game enjoyment and further enhance the possibility of the players continuing the game.

An eighth disclosure is the computer system, wherein the third-type game medium has a plurality of subtypes of third-type game media associated with the common character, and the composition control includes outputting the subtypes of third-type game media as a composition result, in accordance with the specific combination of the game media, the first specific material game medium or the second specific material game medium, and the game media to be combined in the composition.

According to the disclosure, in some embodiments, since there is the subtype of the third-type game media, it will take time for the player to make a complete collection of the game media related to the common character. This means an increase in completion elements for the player. Together with enhancement in game enjoyment, it is possible to motivate the player to continue the game for a long time.

A ninth disclosure is the computer system, wherein the first-type game medium is set with a first-type display mode based on the common character as a display mode of the game medium, the second-type game medium is set with a second-type display mode based on the common character as a display mode of the game medium, the third-type game medium is set with a third-type display mode based on the common character as a display mode of the game medium, and the at least one processor or circuit is further programmed to execute performing a third-type display mode change control of allowing the display mode of the third-type game medium to be changed to (1) the first-type display mode if the first specific material game medium is used as a composition material of the third-type game medium, and to be changed to (2) the second-type display mode if the second specific material game medium is used as a composition material of the third-type game medium.

The "display mode based on the common character" is the display mode in which the player can recognize the common character from its features in appearance. For example, if the common character is drawn at different angles/poses/zooms, the resultant images are recognized as depicting the same common character. They correspond to the unique "display modes based on the common character". For example, if a 3D model of the common character is represented in a rendering image captured by a virtual camera, different display modes are produced depending on differences in the pose set to the 3D model and differences in imaging conditions such as settings of imaging angle and imaging field of view of the virtual camera.

According to the disclosure, in some embodiments, respective unique display modes are prepared for the first-type to third-type game media, which strongly motivates the player to collect all the types of game media related to the common character.

If the third-type game medium composed of the first specific material game medium as a material is used in the game, the applied display mode is selectable between the third-type display mode and the first display mode of the first-type game medium. If the third-type game medium composed of the second specific material game medium as a material is used in the game, the applied display mode is selectable between the third-type display mode and the second display mode of the second-type game medium.

That is, by the composition, the third-type game medium inherits the right to use the display mode related to the game medium as a decomposition source of the specific material game medium. To the player, the third-type game medium seems like a more perfect entity as an upper-class common character than the first-type game medium and the second-type game medium. This is a strong incentive for the player to obtain the third-type game medium how much time and effort it may require.

A tenth disclosure is the computer system, wherein the at least one processor or circuit is further programmed to execute managing information on the game media owned by each player.

According to the disclosure, in some embodiments, the player can enjoy gameplay by compositing the game media he or she owns (has the right to use in the game).

An eleventh disclosure is a game system comprising:

a server system that is any one of the computer systems; and a player terminal of each player.

According to the disclosure, in some embodiments, it is possible to implement a game system that produces the advantageous effects described above.

Hereinafter, examples of embodiments of the present disclosure will be described. Note that modes to which the present disclosure is applicable are not limited to the following embodiments.

First Embodiment

FIG. 1 is a diagram illustrating an example of a configuration of a game system.

A game system 1000 includes a server system 1100 and a player terminal 1500 that are connected so as to be capable of data communication via a network 9.

The game system 1000 is a computer system that provides an online game to a player 2 that is a user of the player terminal 1500. As a matter of course, the game system 1000 may provide other services.

The network 9 is a communication channel capable of data communication. Specifically, the network 9 includes a communication network such as a local area network (LAN) using a private line (a private cable) for direct connection or Ethernet (registered trademark), a telecommunication network, a cable network, and the Internet. A communication method may be a cable communication method or a wireless communication method.

The server system 1100 is a computer system that includes, for example, a main body device 1101, a keyboard 1106, a touch panel 1108, and a storage 1140. The main body device 1101 has a control board 1150.

The control board 1150 includes a microprocessor of various kinds (e.g., a central processing unit (CPU) 1151, a graphics processing unit (GPU), or a digital signal processor (DSP)), an integrated circuit (IC) memory 1152 of various kinds (e.g., a video random-access memory (VRAM), a random-access memory (RAM), or a read-only memory (ROM)), and a communication device 1153. The control board 1150 may be implemented partially or entirely by an application specific integrated circuit (ASIC), a field-programmable gate array (FPGA), or a system on a chip (SoC).

Through a calculation process performed by the control board 1150 based on predetermined programs and data, the server system 1100) implements: (1) a user management function of managing information related to user registration and the like; (2) an online shopping function of selling various game media such as characters and items, usable in the game, to the user online; and (3) a game management function of providing data necessary for the player 2 to perform gameplay and managing execution control of the game on the player terminal 1500. That is, the game in the present embodiment is implemented as a kind of client-server online game.

FIG. 1 illustrates only one player terminal 1500, however, a plurality of player terminals 1500 can simultaneously access the server system 1100 in an actual system operation.

FIG. 1 also illustrates the server system 1100 including only one server device, however, the server system 1100 may be implemented by a plurality of devices. For example, the server system 1100 may be configured such that a plurality of blade servers sharing functions are connected together via an internal bus so as to be capable of data communication. Hardware included in the server system 1100 may be installed anywhere. The server system 1100 may be configured such that a plurality of independent servers installed at remote places perform data communication via the network 9 to function as the server system 1100 as a whole.

Figure 2:
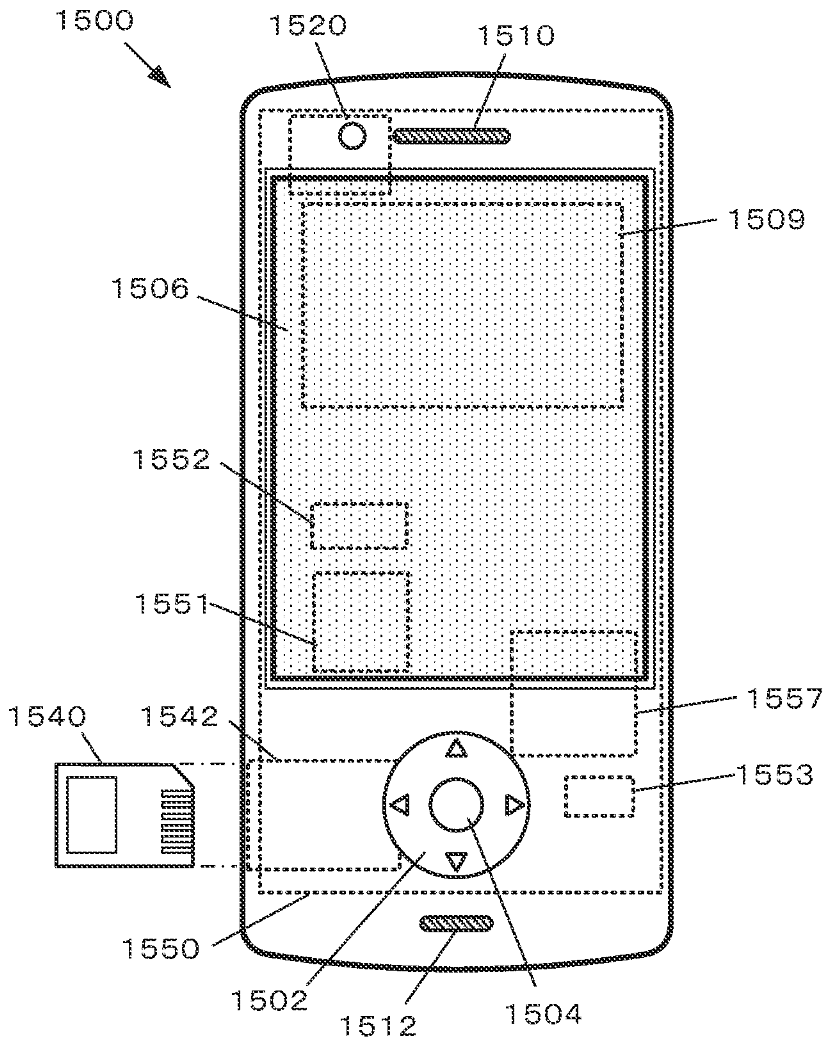
FIG. 2 is a front view of a configuration example of a player terminal.

FIG. 2 is a front view of an example of a configuration of the player terminal 1500. The player terminal 1500 is a computer system that is used by a registered user for using the game system 1000 in the present embodiment, and is an electronic apparatus (electronic device) that can access the server system 1100 via the network 9. The player terminal 1500 is a device for the user to perform gameplay.

The player terminal 1500 illustrated in FIG. 2 is a device known as a smartphone. The user terminal 1500 may also be a wearable computer such as a smartwatch or smartglasses, a portable game device, a tablet computer, a personal computer, or the like. If a plurality of electronic devices such as a combination of a smartphone and a smartwatch communicably connected to the smartphone are communicably connected to perform one function, the plurality of electronic devices can be regarded as one player terminal 1500.

The player terminal 1500 includes an arrow key 1502, a button switch 1504, a touch panel 1506 functioning as an image display device and a touch position input device, a built-in battery 1509, a speaker 1510, a microphone 1512, a camera 1520, a control board 1550, and a memory card reader 1542 capable of writing and reading data on and from a memory card 1540 that is a computer-readable storage medium. The player terminal 1500 further includes a power button, a volume control button, and the like (not illustrated). Furthermore, the player terminal 1500 may include an IC card reader capable of contactless writing and reading of data on and from an IC card, such as a credit card or a prepaid card, that can be used to pay a use cost for the game system 1000 and the like.

The control board 1550 includes (1) various microprocessors such as a CPU 1551, a GPU, and a DSP, (2) various IC memories 1552 such as a VRAM, a RAM, and a ROM, (3) a wireless communication module 1553 for performing wireless communications with a mobile phone base station, a wireless LAN base station, or the like connected to the network 9, (4) an interface circuit 1557, and the like.

The interface circuit 1557 includes (1) a driver circuit for the touch panel 1506, (2) a circuit that receives signals from the arrow key 1502 and the button switch 1504, (3) an output amplifier circuit that outputs sound signals to the speaker 1510, (4) an input signal generation circuit that generates signals of sound collected by the microphone 1512, (5) a circuit that inputs image data of images captured by the camera 1520, and (6) a signal input-output circuit that inputs and outputs signals to and from the memory card reader 1542.

These elements mounted on the control board 1550 are electrically connected with each other via a bus circuit or the like to exchange data and signals. The control board 1550 may be partially or entirely implemented by an ASIC, an FPGA, or an SoC. The control board 1550 stores programs and various kinds of data for implementing a function of the player terminal in the IC memory 1552.

The player terminal 1500 is configured to download programs and various kinds of setting data from the server system 1100 in the present embodiment. Alternatively, the player terminal 1500 may be configured to read the programs and the data from a storage medium such as the memory card 1540 additionally provided.

Next, a game provision service will be described.

The game played on the player terminal 1500 is an online game executed in a client-server system in which the server system 1100 is a game server.

Information on progress of the game and information on display of a game screen are generated on the server system 1100 and provided as appropriate to the player terminal 1500. The player terminal 1500 functions as a terminal for operation input and game screen display. That is, based on the information provided by the server system 1100, the player terminal 1500 displays the game screen and transmits all operation input information to the server system 1100. The server system 1100 causes the game to progress based on the operation input information transmitted from the player terminal 1500.

Figure 3:
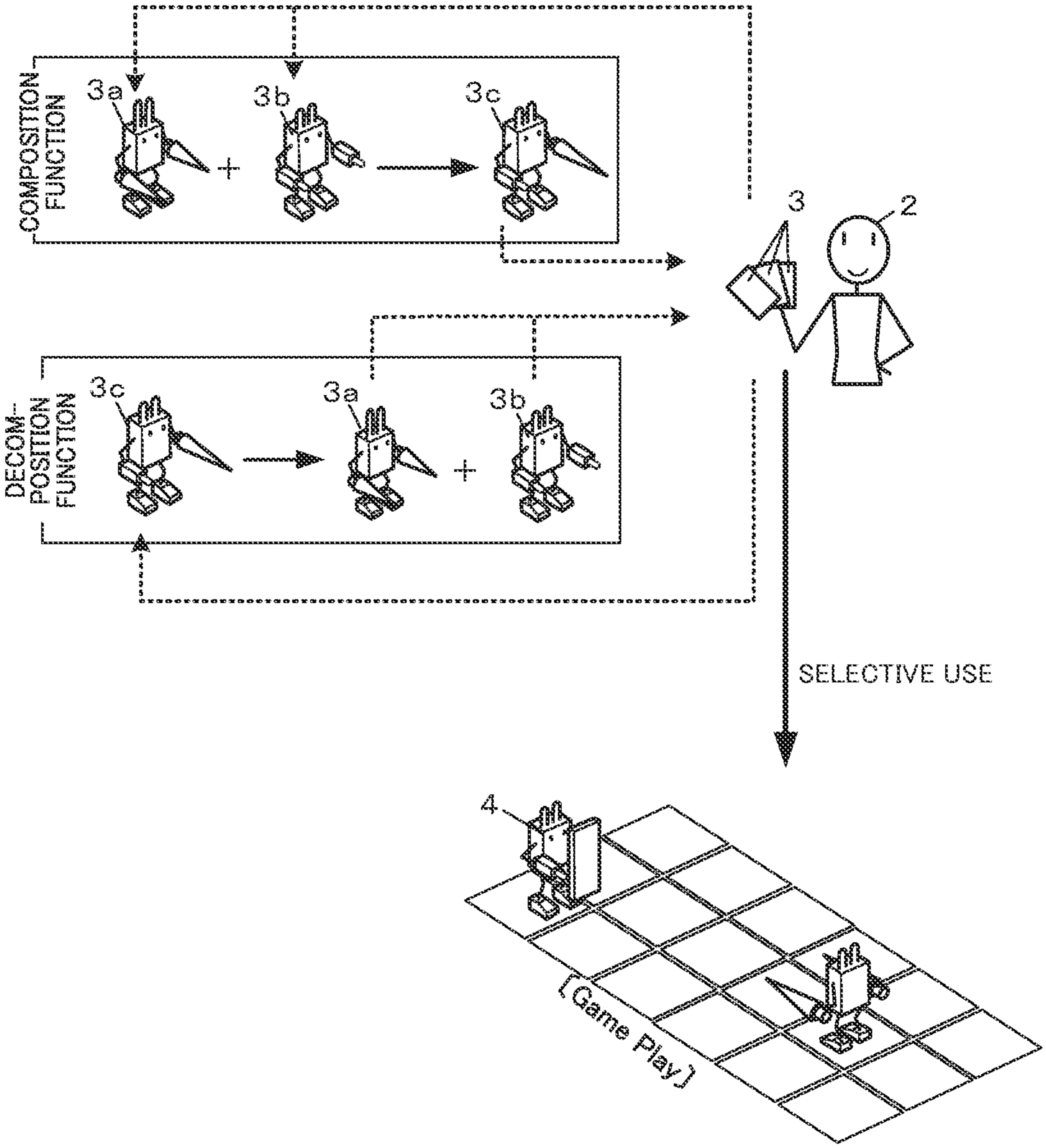
FIG. 3 is a diagram for describing game media used in a game.

FIG. 3 is a diagram for describing game media used in the game.

The player 2 selects favorable game media 3 from among the game media 3 he/she owns (has the right to use in the game), and performs gameplay using the selected media 3 as a player character 4. The positioning of the game media 3 in the game may be set as appropriate in accordance with the contents of the game. For example, the game media 3 may be persons, items, buildings, vehicles, virtual animals to be trained, tools, weapons, protections, or the like.

The game in the present embodiment is a war simulation game in which the player 2 as a player character (a character capable of being operated by the player in the game) uses robot weapons to battle with a computer-controlled opponent. Therefore, the appearance of the game media 3 as a character appearing in the game is a robot weapon or auxiliary equipment that can be combined into a robot weapon. The game media 3 are handled as 3D models with actions in gameplay, and are handled as cards in non-gameplay scenes (for example, at the time of ownership management or selection of game media to be used in the game).

In the game, the composition function of the game media 3 and the decomposition function of the game media 3 are prepared in advance.

The "composition function" refers to depriving from the player the right to use the plurality of game media 3 as composition materials in the game and granting the player the right to use a game medium 3 of the same type as or a type different from the materials. It seems to the player as if the game media 3 as materials are consumed and a new game medium 3 as a composition result is generated.

Specifically, if the plurality of game media 3 as composition materials are of different types, a game medium 3 of a different type from the materials is granted as a composition result. In the example of FIG. 3, a game medium 3*a* and a game media 3*b* are materials, and a game medium 3*c* is a composition result. If the plurality of game media 3 is of the same type, the game medium 3 of the same type as the materials is granted as a composition result, but the ability parameter value of the game medium 3 as a composition result is set to be higher than those of the game media of the same type as materials. That is, power-up composition is performed. In the present embodiment, it is predetermined what type of game medium is to be obtained as a composition result from what combination of the types of game media as materials.

The "decomposition function" refers to, contrary to the composition function, depriving from the player the right to use one game medium 3 as a decomposition material in the game and granting the player the right to use a plurality of game media 3 of a type different from the material. It seems to the player 2 as if the game medium 3 as a material is decomposed into a plurality of game media 3 of different types as a decomposition result. In the present embodiment, it is predetermined what type of game medium is to be decomposed into how many and what types of game media. FIG. 3 illustrates an example of decomposition reversible from the example of composition. However, the decomposition may be irreversible (the type of pre-composition game medium cannot be obtained by combining and compositing game media having been obtained by decomposition).

Figure 4:
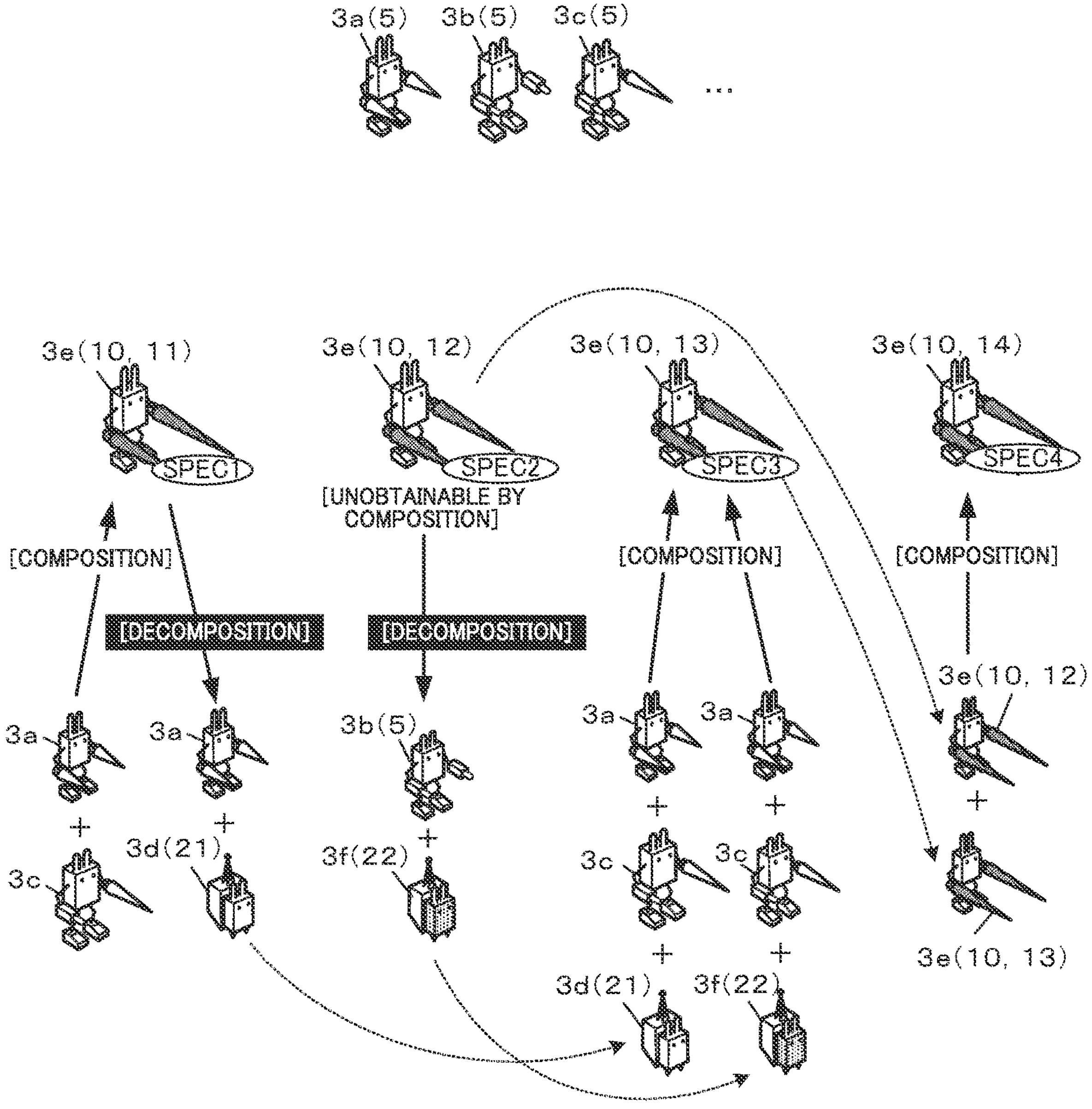
FIG. 4 is a diagram for describing common characters and small-fry characters.

As illustrated in FIG. 4, the game media 3 can be classified into common characters 10 that are popular characters and small-fry characters 5.

The common characters 10 are relatively strong and well-shaped characters the player 2 wishes to use as player characters. If the game is based on an original work such as a comic or animation, the common characters 10 correspond to hero/heroin characters or semi-hero/heroin characters in the comic or animation. For robot weapons, the common characters 10 correspond to high-performance special machines.

The small-fry characters 5 are relatively weaker characters than the common characters 10, which are usually characters the player 2 does not wish to use as player characters. If the game is based on an original work such as a comic or animation, the small-fry characters 5 are extras or mob extras around hero/heroin characters or semi-hero/heroin characters in the original work. In the case of robot weapons, the small-fry characters 5 are mediocre-performance mass-produced machines.

The common characters 10 are adjusted in number so as to be rarer than the small-fry characters 5. Specifically, the number of the common characters 10 is controlled such that, if new game media 3 are granted in accordance with the progress of the game, the small-fry characters 5 are more likely to be granted than the common characters 10. That is, as the game proceeds, the player 2 will have in hand more small-fry characters 5 than common characters 10. In the example of FIG. 4, there is only one type of common characters 10. In actuality, a plurality of types of common characters 10 may be prepared.

One type of small-fry characters 5 is associated with one type of game media 3 on a one-to-one basis, whereas one type of common characters 10 is associated with four types of game media, that is, the first-type game medium 11, the second-type game medium 12, the third-type game medium 13, and the fourth-type game medium 14. The first-type game medium to the fourth-type game medium 14 are set to have many types of abilities of a player character in common when being used in the game, but are set to be different in some abilities (described in detail later).

That is, for the common characters 10, the types of characters and the types of game media are associated with each other on a one-to-one basis. When viewed from the opposite side, the first-type game medium 11 to the fourth-type game medium 14 are of different types in the internal process of the server system 1100, but are assigned common characters that have the same external features on the game screen and are regarded as the same type.

The game media "having the same external features and regarded as the same type" mean that the game media can be identified as the same type in the identification of character type. This means, for example, that if one character is drawn at different angles/poses/zooms, the resultant images will be recognized as depicting the same character from its external features such as shape and colors, and thus as a common character.

The first-type game medium 11, the second-type game medium 12, the third-type game medium 13, and the fourth-type game medium 14 are different from one another in how to obtain.

First, the second-type game medium 12 cannot be obtained by the composition function. For example, the second-type game medium 12 can be obtained in limited ways, such as giveaways distributed to participants in a given event in the real world or game world held by the provider of the game system 1000 or prizes in celebration of collaboration with other media such as magazines. In particular, in the present embodiment, the display mode of the second-type game medium 12 is set as a special display mode different from those of the first-type game medium 11 and the third-type game medium 13, and the effect related to the common character in the case of using the second-type game medium 12 is set as a special effect different from those in the cases of using the first-type game medium 11 and the third-type game medium 13. This will arouse the desire of the player 2 to obtain the second-type game medium 12.

The first-type game medium, the third-type game medium, and the fourth-type game medium 14 can be obtained using the composition function.

The first-type game medium 11 can be obtained as a composition result in the case of performing composition using a "specific combination" of the game media 10 in the composition function. The "specific combination" is a recipe for obtaining the first-type game medium 11 as a composition result, and the combination may be set as appropriate. The specific combination in the example of FIG. 4 is "game medium 3*a* that is a small-fry character 5+game medium 3*c* that is a small-fry character 5". If a large number of small-fry characters 5 is included in the specific combination, the small-fry characters 5, which tend to be increasingly granted to the player 2 and accumulated in accordance with the progress of the game, can be preferably consumed.

The third-type game medium 13 can be obtained as a composition result by performing the composition function in the case of (1) using the specific combination that is a recipe for obtaining the first-type game medium 11 as a composition result and a first specific material game medium 21 that can be obtained only by decomposing the first-type game medium 11 in the decomposition function, or (2) using the specific combination and a second specific material game medium 22 that can be obtained only by decomposing the second-type game medium 12 in the decomposition function.

The specific material game media are not limited to two types as illustrated in FIG. 4 and may be of three or more types. The first specific material game medium 21 and the second specific material game medium 22 are described here as different game media, but they may be the same game media as a matter of course. The methods for obtaining the first specific material game medium 21 and the second specific material game medium 22 are not limited to the decomposition of the first-type game medium 11 or the second-type game medium 12. The first specific material game medium 21 and the second specific material game medium 22 may also be obtained by other methods such that they can be given in accordance with gameplay, purchased online, or composited.

The fourth-type game medium 14 can be obtained as a composition result by performing composition using the second-type game medium 12 and the third-type game medium 13 in the composition function.

Assuming that the common characters 10 are popular characters many players 2 want, advantageous effects as described below will be produced. That is, for the player 2 who wishes to make a perfect collection of game media 3 related to the common character 10 he/she likes, he/she needs to collect the first-type game medium 11 to the fourth-type game medium 14 while performing composition and decomposition. Consequently, the player 2 needs to continue the game for a long time.

Focusing on the man-hours for producing the data related to the game media 3, the production of graphic materials and motion materials for presenting the characters corresponding to the game media 3 on the game screen will require the largest number of man-hours. For the common characters 10, all or most of the graphic materials and motion materials can be used in common. Thus, it is possible to increase the collection targets for the player 2 with a far smaller number of man-hours than in the case where the game media 3 and the characters are prepared in one-to-one association.

The common characters 10 are handled differently from the small-fry characters 5 in the composition function, the decomposition function, and control of the display mode on the game screen.

First, the handling of the common characters 10 in the decomposition function will be described.

When the first-type game medium 11 is decomposed, a plurality of game media including the first specific material game medium 21 is obtained as a decomposition result. When the second-type game medium 12 is decomposed, a plurality of game media including the second specific material game medium 22 is obtained as a decomposition result.

In FIG. 4, the first specific material game medium 21 and the second specific material game medium 22 may be game media 3*d* and 3*f* that are classified as the small-fry characters 5. Alternatively, the first specific material game medium 21 and the second specific material game medium 22 may be fifth-type game media different from the first-type game medium 11 to the fourth-type game medium 14 of the common characters 10.

Next, the handling of the common characters 10 in the composition function will be described.

Figure 5:
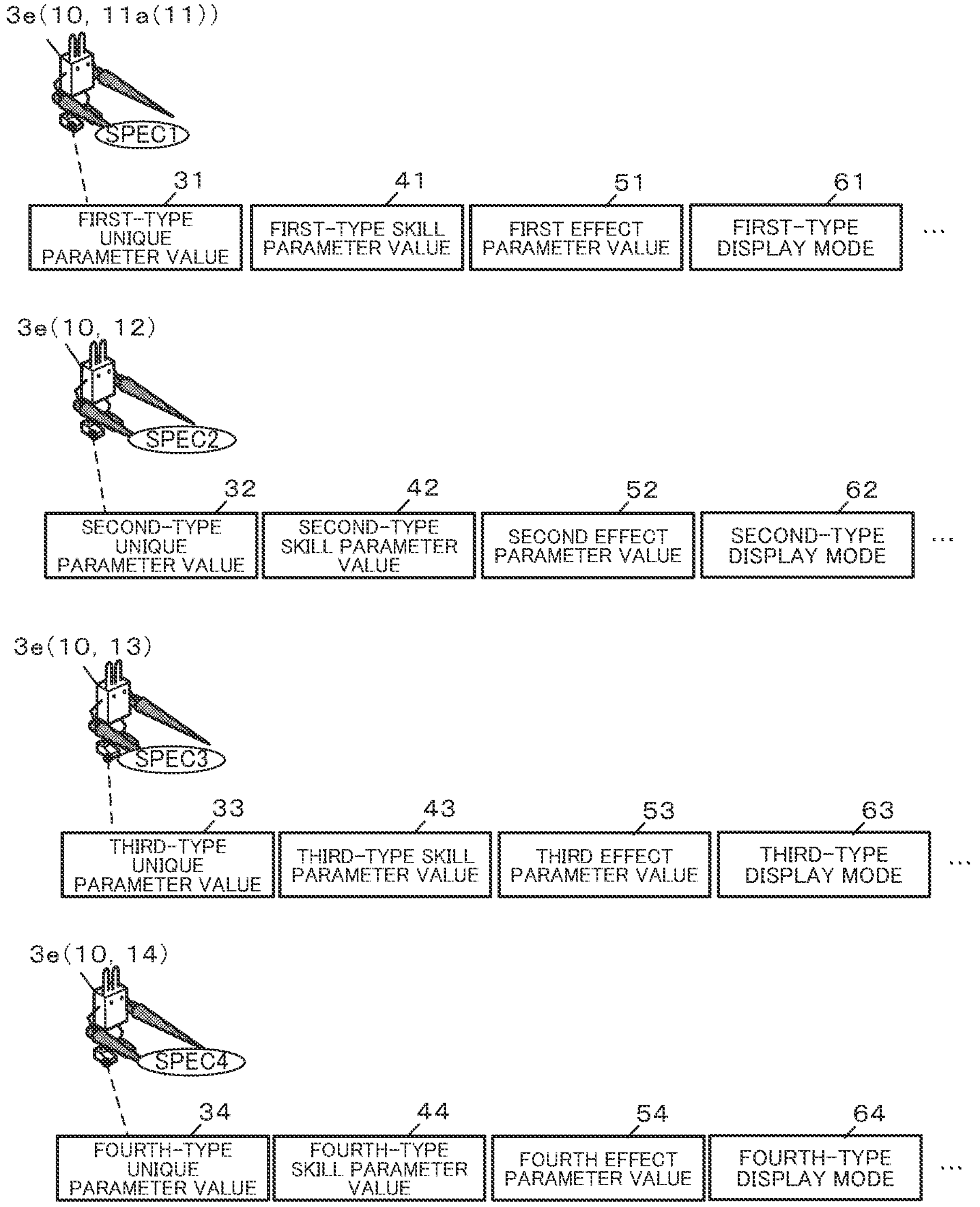
FIG. 5 is a diagram illustrating types of parameter values set to a first-type game medium to a fourth-type game medium.

First, as a precondition, as illustrated in FIG. 5, the first-type game medium 11 is set with a first-type unique parameter value 31 unique to the first-type game medium, the second-type game medium 12 is set with a second-type unique parameter value 32 unique to the second-type game medium, the third-type game medium 13 is set with a third-type unique parameter value 33 unique to the third-type game medium, and the fourth-type game medium 14 is set with a fourth-type unique parameter value 34 unique to the fourth-type game medium. The third-type unique parameter value 33 is a value of higher ability and effect than the first-type unique parameter value 31. This will arouse the desire of the player 2 to obtain the third-type game medium 13 rather than or in addition to the first-type game medium 11. The first-type unique parameter value 31 and the second-type unique parameter value 32 are different values here, but they may be the same values.

The first-type game medium 11 is set with a first-type skill and a first-type skill parameter value 41 unique to the first-type game medium, and the second-type game medium 12 is set with a second-type skill and a second-type skill parameter value 42 unique to the second-type game medium. The third-type game medium 13 is set with a third-type skill and a third-type skill parameter value 43 unique to the third-type game medium, and the fourth-type game medium 14 is set with a fourth-type skill and a fourth-type skill parameter value 44 unique to the fourth-type game medium. The third-type skill of the third-type game medium 13 is a stronger and more effective skill than the first-type skill of the first-type game medium 11. The first-type skill and the first-type skill parameter value 41, and the second-type skill and the second-type skill parameter value 42 are different here, but they may be the same. This will arouse the desire of the player 2 to obtain the third-type game medium 13 rather than or in addition to the first-type game medium 11. The first-type game medium 11 may not be set with the first-type skill unique to the first-type game medium and the first-type skill parameter value 41.

The "unique parameter values" includes a parameter value related to the ability unique to the game medium of the corresponding type. Specifically, the unique parameter values may be related to, for example, how to use weapons, more specifically, setting values of single shooting, three-round burst shooting, and fully automatic shooting. In addition, the "unique parameter values" also include a parameter value for unique mode of display in the display control of the corresponding common character 10 on the game screen. Specifically, the unique parameter values may be, for example, setting values of imaging angle and imaging field of view of a virtual camera in motion. The unique parameter values may be predetermined values for indicating substantially "no setting" (for example, "0" or "null"). As a matter of course, the unique parameters may be simply ability parameter values for fighting strength, defensive strength, and traveling force when the corresponding game medium is used. The unique parameter values may be values indicating the types of equipment.

The "skills" mean additional special abilities other than the common general abilities of the common characters 10. A plurality of types of skills is prepared for the common characters 10. The skill parameter values indicate the degrees of effectiveness of skills of the types added.

Figure 6:
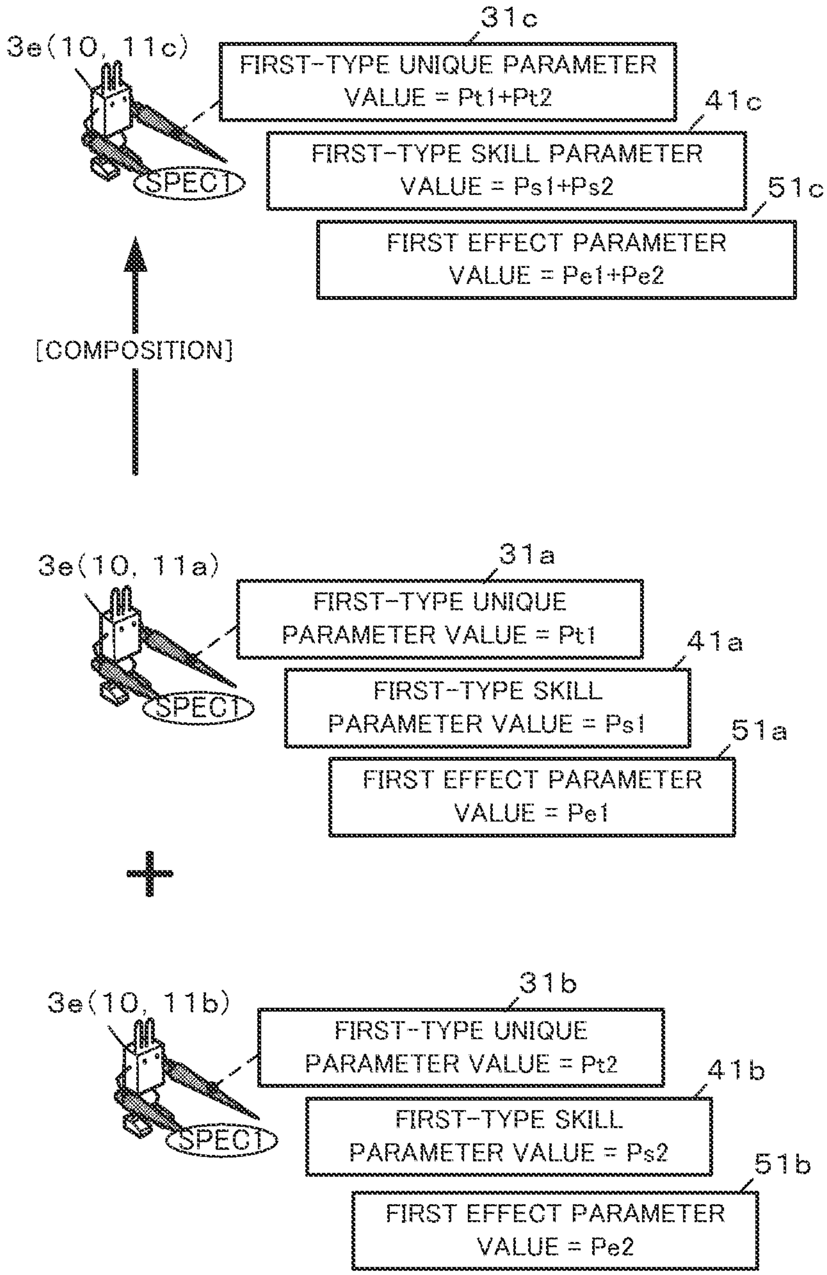
FIG. 6 is a diagram for describing handling of unique parameter values, skill parameter values, and effect parameter values in composition of the first-type game medium to the fourth-type game medium.

As illustrated in FIG. 6, when composition is performed using the first-type game media 11 (11*a* and 11*b* handled as separate game media 3) in the composition function, a new first-type game medium 11*c* is obtained as a composition result in which the first-type unique parameter value 31 is more improved than those of the first-type game media 11 (11*a* and 11*b*) as materials. In the example of FIG. 6, the first-type unique parameter value 31 of the first-type game medium 11*c* is set by simply summing the first-type unique parameter values 31 of the first-type game media 11 (11*a* and 11*b*). However, the parameter value improvement may not be made by simply summing.

Similarly, when composition is performed using the second-type game media 12, a new second-type game medium 12 is obtained as a composition result in which the second-type unique parameter value 32 is more improved than those of the second-type game media 12 as materials. Still similarly, when composition is performed using the third-type game media 13, a new third-type game medium 13 is obtained as a composition result in which the third-type unique parameter value 33 is more improved than those of the third-type game media 13 as materials. As a matter of course, the same thing applies to the fourth-type game media 14.

In addition, a new first-type game medium 11 with improvement in the first-type skill parameter value 41 can be obtained as a composition result only by performing composition using the first-type game media 11 in the composition function. Similarly, a new second-type game medium 12 with improvement in the second-type skill parameter value 42 can be obtained as a composition result only by performing composition using the second-type game media 12. Still similarly, a new third-type game medium 13 with improvement in the third-type skill parameter value 43 can be obtained as a composition result only by performing composition using the third-type game media 13. As a matter of course, the same thing applies to the fourth-type skill parameter value 44 of the fourth-type game medium 14.

In this manner, if the first-type game medium 11, the second-type game medium 12, and the third-type game medium 13 are set with unique parameter values corresponding to the type and skill parameter values by skill type, the first-type game medium 11 to the fourth-type game medium 14 belong to the same common character 10 from the view of the player 2 but make differences in "specification", "skill", "ability", and "version" due to their respective parameter values when they are used in the game. For the first-type game medium 11 to the fourth-type game medium 14, composting the game media of the same type allows "power-up composition" in which the unique parameter values and skill parameter values of the game media as materials are more improved than before the composition.

In the present embodiment, the effects can be inserted on the game screen.

As illustrated in FIG. 5, with regard to the effects, the first-type game medium 11 is set with a first effect parameter value 51 for a first effect, the second-type game medium 12 is set with a second effect parameter value 52 for a second effect, the third-type game medium 13 is set with a third effect parameter value 53 for a third effect, and the fourth-type game medium 14 is set with a fourth effect parameter value 54 for a fourth effect.

Each of the first to fourth effects is at least one of play control of a given video, output control of a given sound, cut-in still image, and play control of given character motion, and they are different in contents of the effects.

The "effect parameter values" are setting parameter values related to the types of effects to be inserted into the game and execution control of the corresponding effects.

For example, if the type of an effect is a video or sound, its setting parameter values correspond to values specifying the presence or absence of sound effects and BGM and their types, values specifying the presence or absence of an additional indication to be added to the background and the type of the additional indication, and the like, although the scene represented by the video (the contents of the effect) and the remarks uttered in the scene remain unchanged.

For example, if the type of an effect is a cut-in still image, its setting parameter values correspond to values indicating the type, size, and speed of the cut-in, the presence or absence of sound effects added to the cut-in, the types of sound effects, and the like.

For example, if the type of an effect is motion play, its setting parameter values may be values indicating the play speed, the imaging distance and imaging field of view of a virtual camera capturing the motion, the motion of the virtual camera itself, and the like.

As illustrated in FIG. 6, in the composition function, only when the first-type game media 11 are composited, a new first-type game medium 11 can be obtained as a composition result in which the first effect parameter values 51 (51*a*, 51*b*, and 51*c*) are more improved than those of the first-type game media 11 as materials. Similarly, only when the second-type game media 12 are composited, a new second-type game medium 12 can be obtained as a composition result in which the second effect parameter values 52 are more improved than those of the second-type game media 12 as materials. Still similarly, only when the third-type game media 13 are composited, a new third-type game medium 13 can be obtained as a composition result in which the third effect parameter values 53 are more improved than those of the third-type game media 13 as materials. As a matter of course, the same thing applies to the fourth-type game media 14.

For the first-type game medium 11 to the third-type game medium 13, compositing the game media of the same type as materials improves respective effect parameter values rather than those of the materials. That is, it is possible to enhance game enjoyment by adding growth and completion elements related to the presentation of the effects of the first-type game medium 11 to the third-type game medium 13.

Figure 7:
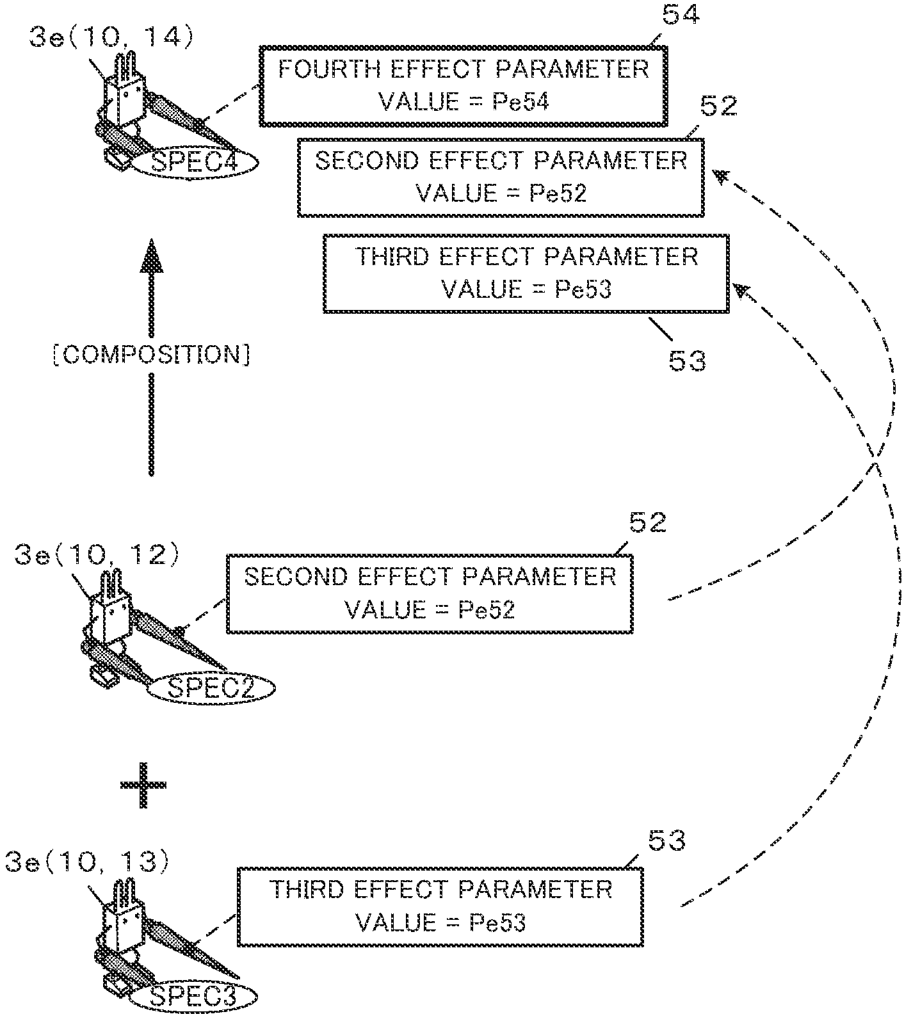
FIG. 7 is a diagram for describing handling of effect parameter values in composition of the first-type game medium to the fourth-type game medium.

As illustrated in FIG. 7, with regard to the composition function, if the second-type game medium 12 and the third-type game medium 13 are composited, the fourth-type game medium 14 is obtained as a composition result that can execute the second effect associated with the second-type game medium 12 and the third effect associated with the third-type game medium 13.

That is, the fourth-type game medium 14 as a composition result has the second effect parameter value 52 and the third effect parameter value 53 in addition to the fourth effect parameter value 54. The fourth-type game medium 14 can execute the second effect of the second-type game medium 12 and the third effect of the third-type game medium 13 as composition materials. In other words, the fourth-type game medium 14 inherits the effects that can be executed by the second-type game medium 12 and the third-type game medium 13. For the player, the fourth-type game medium 14 is a nearly perfect entity as a common character 10 into which the second-type game medium 12 and the third-type game medium 13 are brought together, and is an entity the player would really like to obtain.

Figure 8A:
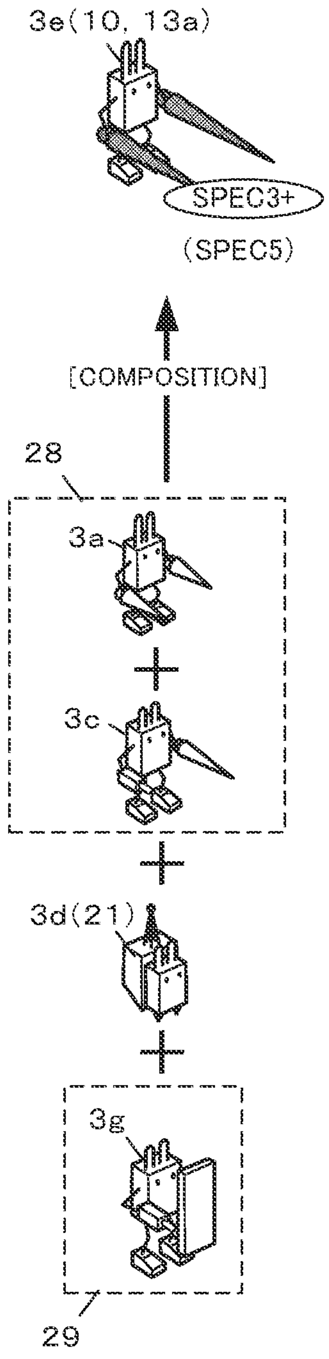
FIG. 8A is a diagram for describing setting of a subtype related to composition of the third-type game media.
Figure 8B:
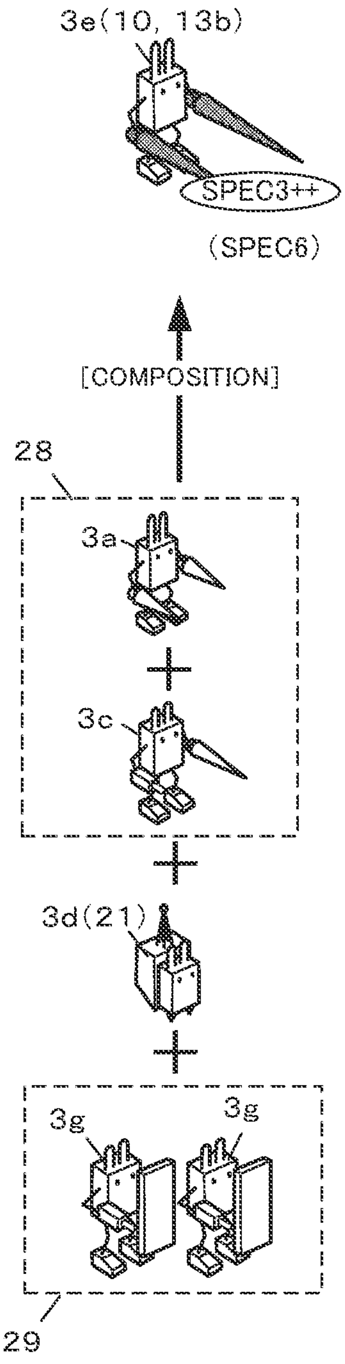
FIG. 8B is a diagram for describing setting of a subtype related to composition of the third-type game media.
Figure 8C:
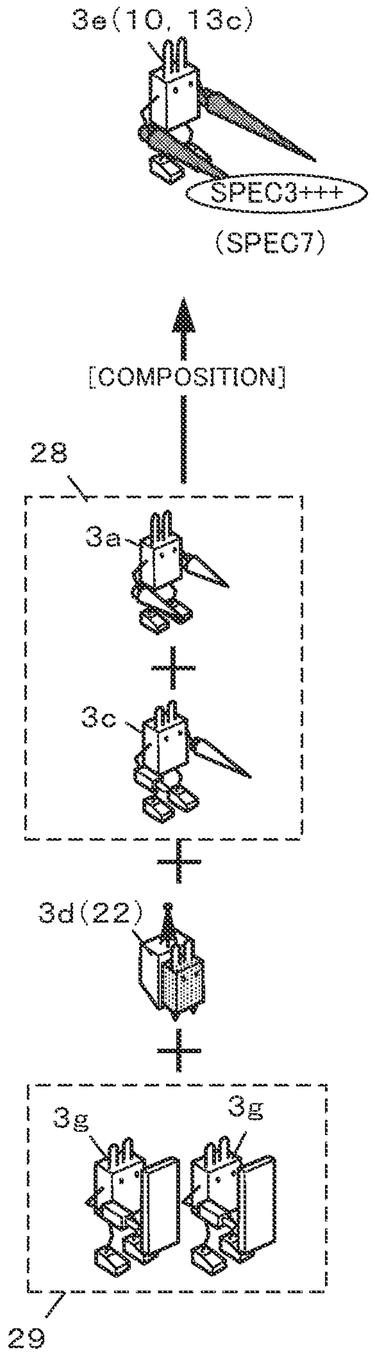
FIG. 8C is a diagram for describing setting of a subtype related to composition of the third-type game media.

As illustrated in FIGS. 8A to 8C, with regard to the composition function, the third-type game medium 13 can be subdivided with finer differences (differences in spec and skill).

That is, a third-type game medium 13 (13*a*, 13*b*, or 13*c*) of any subtype among a plurality of subtypes associated with the common characters 10 can be obtained as a composition result in accordance with game media to be combined in the composition (additional materials 29) in addition to the specific combination 28 of the game media 3 and the first specific material game medium 21 or the second specific material game medium 22.

Subdividing the third-type game medium 13 into subtypes provides the player 2 with a more complicated way to make a complete collection of the game media 3 related to the common character 10. For the player 2, completion elements are increased and game enjoyment is further enhanced, which motivates for the player to continue the game for a long time. As a matter of course, the number of subtypes is not limited to three as illustrated in FIGS. 8A to 8C, and may be set as appropriate. Besides the first specific material game medium 21 or the second specific material game medium 22, the game media (additional materials 29) to be combined in the composition are not limited to the example of FIGS. 8A to 8C, and may be set as appropriate.

Next, the handling of the common characters 10 in the control of display mode in the game screen will be described.

As illustrated in FIG. 5, the first-type game medium 11 is set with a first-type display mode 61 based on the common character 10 as the display mode of the game medium, the second-type game medium 12 is set with a second-type display mode 62 based on the common character 10 as the display mode of the game medium, the third-type game medium 13 is set with a third-type display mode 63 based on the common character 10 as the display mode of the game medium, and the fourth-type game medium 14 is set with a fourth-type display mode 64 based on the common character 10 as the display mode of the game medium.

The "display mode based on the common character" is the display mode in which the player can recognize the common character from its features in appearance. For example, if the common character is illustrated at different angles/poses/zooms, the resultant images are recognized as depicting the same common character. They corresponds to the "display modes based on the common character" of different types. For example, if a 3D model of the common character is represented in a rendering image captured by a virtual camera, different types of display modes are produced depending on differences in the pose set to the 3D model and differences in imaging conditions such as settings of imaging angle and imaging field of view of the virtual camera.

The first-type display mode 61 to the fourth-type display mode 64 are different in contents. If a plurality of types is prepared for at least one of the first-type game medium 11 to the fourth-type game medium 14 related to the common character 10, the respective display modes of the game media can be made different. That is, if two types of the first-type game media 11 are prepared, different first-type display modes 61 may be set to the two types of first-type game medium 11.

In the composition function, for the first-type game medium 11 to the fourth-type game medium 14, the game medium as a composition result inherits the display modes of the game media as materials or the game media deprived therefrom.

Figure 9:
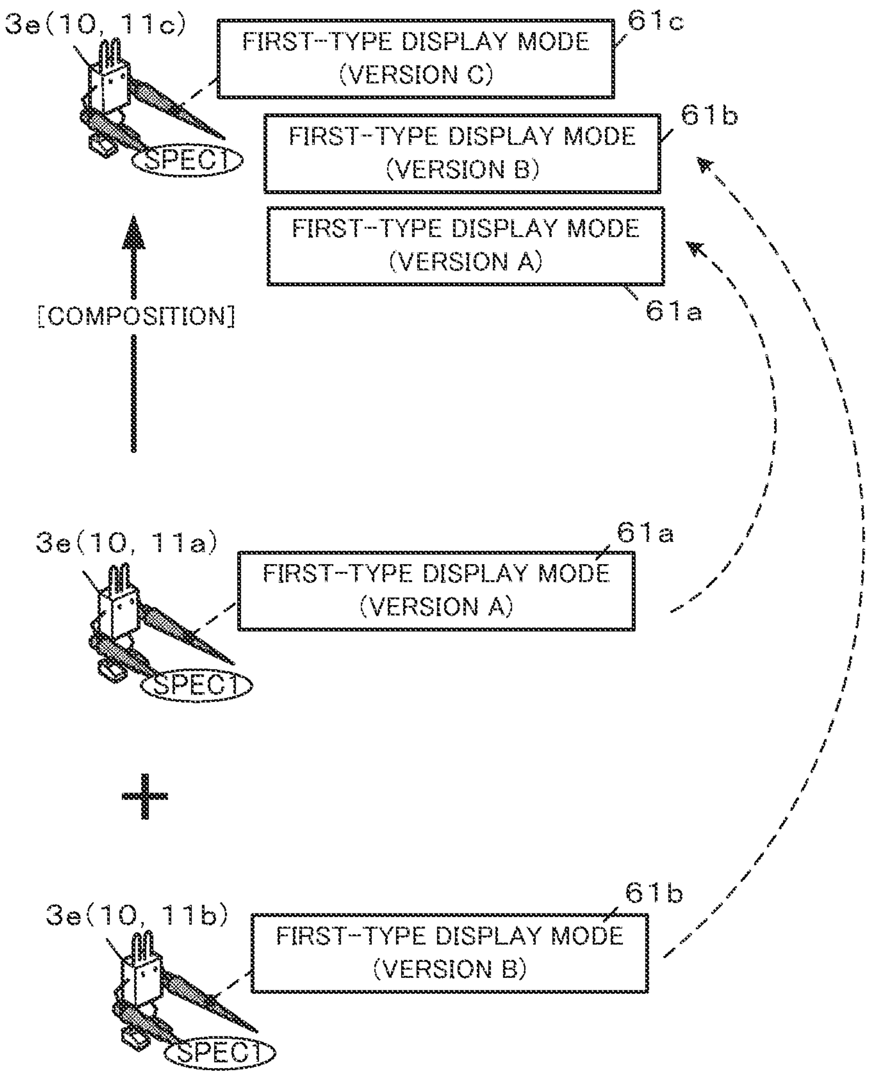
FIG. 9 is a diagram for describing inheritance of display modes in composition of the first-type game medium to the fourth-type game medium.

Specifically, for example, FIG. 9 illustrates inheritance of the display modes in the case where two different first-type game media 11*a* and 11*b* are composited as materials into a new first-type game medium 11*c*.

As illustrated in FIG. 9, the first-type game medium 11*a* as one material is set with a first-type display mode 61*a* (version a), and the first-type game medium 11*b* as the other material is set with a first-type display mode 61*b* (version b) different from the first-type display mode 61*a*. The first-type game medium 11*c* as a composition result is originally set with a first-type display mode 61*c* (version c) different from both the first-type display mode 61*a* and the first-type display mode 61*b*, and is also additionally set with the first-type display mode 61*a* and the first-type display mode 61*b* of both the materials. That is, the game medium as a composition result inherits the display modes of the game media as materials.

Furthermore, a first-type game medium lie obtained by compositing the first-type game medium 11*c* as a composition result and another first-type game medium 11*d* inherits the three display modes set to the first-type game medium 11*c* (the first-type display mode 61*a*, the first-type display mode 61*b*, and the first-type display mode 61*c*) and the first-type display mode 61*d* of the first-type game medium lie. Thus, the first-type game medium 11*e* has total five different first-type display modes 61 including the originally set first-type display mode 61*e*.

The same thing also applies to the composition of the second-type game media 12, the composition of the third-type game media 13, and the composition of the fourth-type game media 14.

Figure 10A:
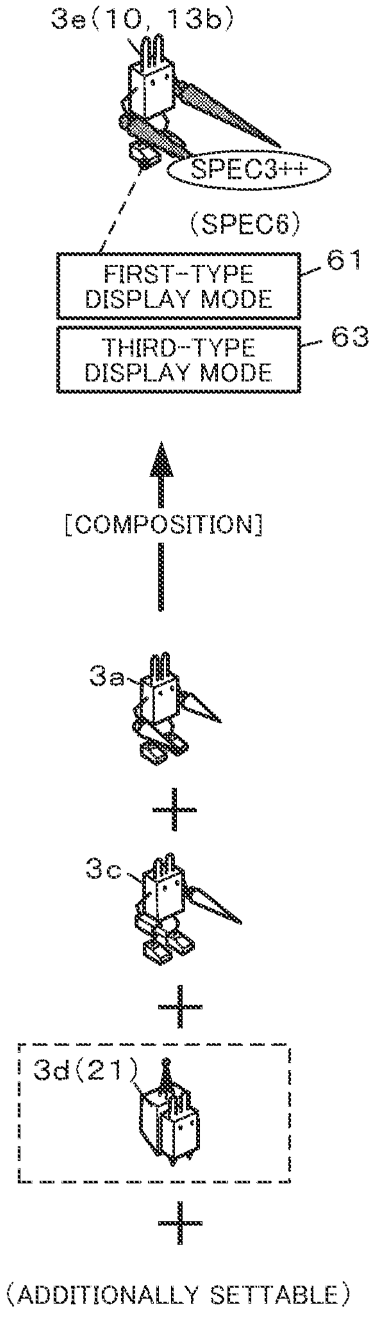
FIG. 10A is a diagram for describing handling of display modes in the third-type game media.
Figure 10B:
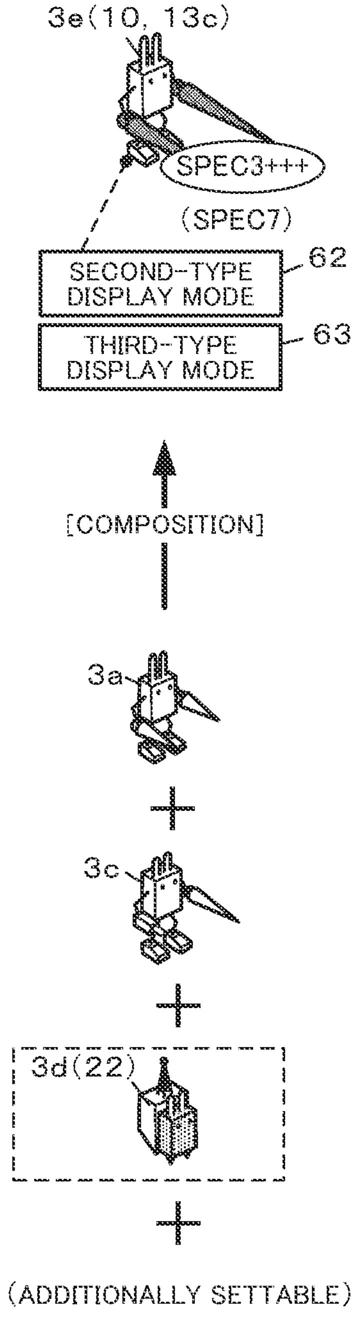
FIG. 10B is a diagram for describing handling of display modes in the third-type game media.

For example, FIGS. 10A and 10B illustrate examples of inheritance in the composition of the third-type game media 13. That is, as illustrated in FIG. 10A, if the composition materials include the first specific material game medium 21 derived from the first-type game medium 11, the third-type game medium 13*b* (13) as a composition result is set with the original third-type display mode 63 and the additional first-type display mode 61. In addition, as illustrated in FIG. 10B, if the composition materials include the second specific material game medium 22 derived from the second-type game medium 12, the third-type game medium 13*c* (13) as a composition result is set with the original third-type display mode 63 and the additional second-type display mode 62.

In other words, the display mode of the third-type game medium 13 can be changed to (1) the first-type display mode 61 if the first specific material game medium 21 is used as a composition material of the third-type game media, and can be changed to (2) the second-type display mode 62 if the second specific material game medium 22 is used as a composition material of the third-type game media.

If one game medium is set with a plurality of display modes as a result of composition as illustrated in FIGS. 9, 10A, and 10B, the player 2 can freely change or select which display mode to be applied to the game medium.

In this manner, for the common character 10, by the composition, the setting of the display modes is inherited from the materials to the composition result so that all the display modes prepared for the common character 10 can be added to one game medium to create a game medium with ultimate options of display modes. This ultimate game medium seems like a worthwhile element for completion to the player 2 who wish to collect all types/versions related to the common character 10, so that the player 2 will continue the game for a long time.

Figure 11:
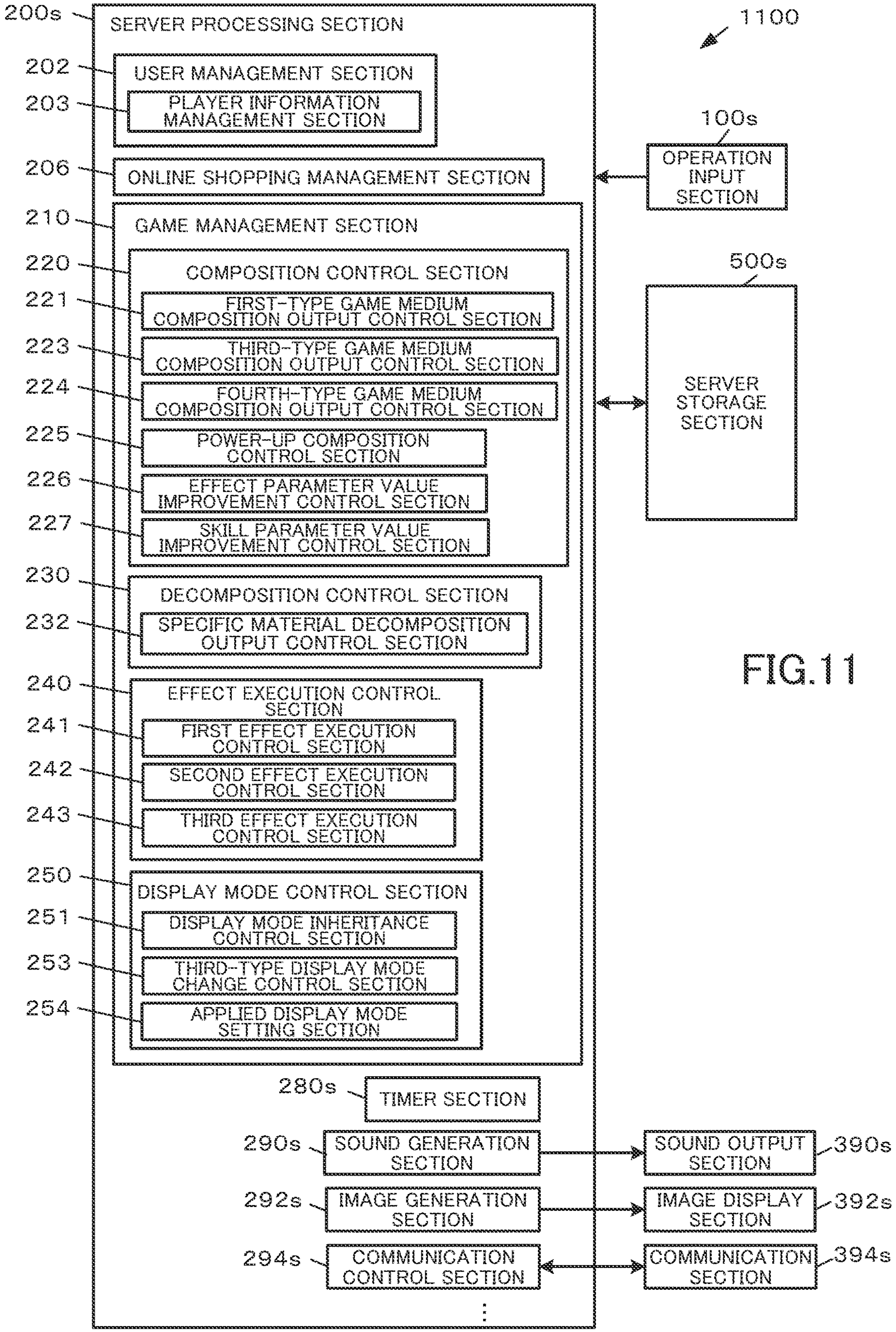
FIG. 11 is a functional block diagram illustrating a functional configuration of a server system in a first embodiment.

Next, a functional configuration for implementing such specifications related to the common character 10 will be described. FIG. 11 is a functional block diagram illustrating a functional configuration example of the server system 1100. The server system 1100 includes an operation input section 100*s*, a server processing section 200*s*, a sound output section 390*s*, an image display section 392*s*, a communication section 394*s*, and a server storage section 500*s*.

The operation input section 100*s* is a means for inputting various operations for server management. The keyboard 1106 illustrated in FIG. 1 corresponds to the operation input section 100*s*.

The server processing section 200*s* is implemented, for example, by a processor that is a calculation circuit such as a CPU, a GPU, an ASIC, or a FPGA and an electronic component such as an IC memory. The server processing section 200*s* controls input and output of data between functional sections including the operation input section 100*s* and the server storage section 500*s*. The server processing section 200*s* performs various calculation processes based on predetermined programs and data, operation input signals from the operation input section 100*s*, data received from the player terminal 1500, or the like to comprehensively control the operations of the server system 1100.

The server processing section 200*s* includes a user management section 202, an online shopping management section 206, a game management section 210, a timer section 280*s*, a sound generation section 290*s*, an image generation section 292*s*, and a communication control section 294*s*. Other functional sections may be included as appropriate.

The user management section 202 performs a process related to a user registration procedure and storage management of various kinds of information associated with user accounts. Specifically, the user management section 202 performs (1) issuance of a unique user account to a registered user, and (2) registration information management for registering and managing personal information for each user account. The user management section 202 also has a player information management section 203 and manages (3) information on game media (such as characters and items) owned by the user.

The online shopping management section 206 is in charge of control related to online shopping. The online shopping management section 206 can be implemented as appropriate with a known online shopping technique. In the present embodiment, the user can purchase game media 3 through online shopping. As a matter of course, any other elements may be set as appropriate to be purchased through online shopping.

The game management section 210 performs progress control and the like of the game. The game management section 210 includes a composition control section 220, a decomposition control section 230, an effect execution control section 240, and a display mode control section 250.

The composition control section 220 executes various processes related to the composition function of the game media 3. Specifically, the composition control section 220 has a first-type game medium composition output control section 221, a third-type game medium composition output control section 223, a fourth-type game medium composition output control section 224, a power-up composition control section 225, an effect parameter value improvement control section 226, and a skill parameter value improvement control section 227.

In the case of performing composition using a given specific combination of game media 3 as materials, the first-type game medium composition output control section 221 outputs the first-type game medium 11 as a composition result (see FIG. 4)

In the case of performing composition using a given specific combination of game media 3 and the first specific material game medium 21 as materials, or in the case of performing composition using a given specific combination of game media and the second specific material game medium 22, the third-type game medium composition output control section 223 outputs the third-type game medium 13 as a composition result (see FIG. 4).

In the case of performing composition using a given specific combination of game media 3 and the first specific material game medium 21 or the second specific material game medium 22 as materials and in accordance with the game media (additional materials 29) to be combined in the composition, the third-type game medium composition output control section 223 outputs a third-type game medium 13 of any of a plurality of subtypes as a composition result (see FIGS. 8A to 8C).

In the case of performing composition using the second-type game medium 12 and the third-type game medium 13, the fourth-type game medium composition output control section 224 outputs the fourth-type game medium 14 that is associated with the common character 10 of the second-type game medium 12 and the third-type game medium 13 and is capable of executing the second effect associated with the second-type game medium 12 and the third effect associated with the third-type game medium, as a composition result (see FIG. 7).

The power-up composition control section 225 performs controls to realize "power-up composition" (see FIG. 6). That is, the power-up composition control section 225 performs (1) a control to, only if composition is performed using the first-type game media 11, output a new first-type game medium 11 with improvement in the first-type unique parameter value 31 as a composition result, (2) a control to, only if composition is performed using the second-type game media 12, output a new second-type game medium 12 with improvement in the second-type unique parameter value 32 as a composition result, and (3) a control to, only if composition is performed using the third-type game media 13, output a new third-type game medium with improvement in the third-type unique parameter value 33 as a composition result.

At execution of composition satisfying a given condition, the effect parameter value improvement control section 226 outputs a new game medium with improvement in effect parameter value as a composition result (see FIG. 6).

That is, the effect parameter value improvement control section 226 performs (1) a control to, only if composition is performed using the first-type game media 11, output a new first-type game medium 11 with improvement in the first effect parameter value 51 as a composition result, (2) a control to, only if composition is performed using the second-type game media 12, output a new second-type game medium 12 with improvement in the second effect parameter value 52 as a composition result, and (3) a control to, only if composition is performed using the third-type game media 13, output a new third-type game medium 13 with improvement in the third effect parameter value 53 as a composition result.

At execution of composition satisfying a given condition, the skill parameter value improvement control section 227 outputs a new game medium with improvement in skill parameter value as a composition result (see FIG. 6).

That is, the skill parameter value improvement control section 227 performs (1) a control to, only if composition is performed using the first-type game media 11, output a new first-type game medium 11 with improvement in the first-type skill parameter value 41 as a composition result, (2) a control to, only if composition is performed using the second-type game media 12, output a new second-type game medium 12 with improvement in the second-type skill parameter value 42 as a composition result, and (3) a control to, only if composition is performed using the third-type game media 13, output a new third-type game medium 13 with improvement in the third-type skill parameter value 43 as a composition result.

The decomposition control section 230 executes various processes related to the composition function of the game media 3.

Specifically, the decomposition control section 230 has a specific material decomposition output control section 232.

In the case of decomposing the first-type game medium 11, the specific material decomposition output control section 232 performs a control to output a plurality of game media including the first specific material game medium 21, and in the case of decomposing the second-type game medium 12, the specific material decomposition output control section 232 performs a control to output a plurality of game media including the second specific material game medium 22 (see FIG. 4).

The effect execution control section 240 performs various controls related to the execution of the effects in accordance with the game media used in gameplay. Specifically, the effect execution control section 240 has a first effect execution control section 241, a second effect execution control section 242, and a third effect execution control section 243.

The first effect execution control section 241 performs a control to execute the first effect in the case where the first-type game medium 11 is used in gameplay. The second effect execution control section 242 performs a control to execute the second effect different from the first effect in the case where the second-type game medium 12 is used in gameplay. The third effect execution control section 243 performs a control to execute the third effect different from the first effect and the second effect in the case where the third-type game medium 13 is used in gameplay, and performs (1) a control to execute the first effect when the first specific material game medium 21 is used as a composition material of the third-type game media, and (2) a control to execute the second effect when the second specific material game medium 22 is used as a composition material of the third-type game media (see FIG. 7).

The display mode control section 250 performs various controls related to setting of the display modes of the game media and implementation of the display modes.

Specifically, the display mode control section 250 has a display mode inheritance control section 251, a third-type display mode change control section 253, and an applied display mode setting section 254.

The display mode inheritance control section 251 performs a control to inherit the setting of the display modes of the game media as materials to the setting of the display mode of the game medium as a composition result.

That is, in the case where a plurality of game media of the same type is used as composition materials, the display mode inheritance control section 251 performs a control to add at least one of the settings of the display modes of the plurality of game media of the same type to the setting of the display mode of the game medium as a composition result (see FIG. 9).

The third-type display mode change control section 253 performs (1) a control to, when the first specific material game medium 21 is used as a composition material of the third-type game media, allow the display mode of the third-type game medium 13 to change to the first-type display mode, and (2) a control to, when the second specific material game medium 22 is used as a composition material of the third-type game media, allow the display mode of the third-type game medium 13 to change to the second-type display mode (see FIGS. 10A and 10B). That is, the third-type display mode change control section 253 implements inheritance of settings on the display mode from the composition materials to the composition result, based on the game medium derived from the composition materials.

The timer section 280*s* uses a system clock to measure the current date and time, a limited time period, and others.

The sound generation section 290*s* is implemented by execution of an IC or software for generating and decoding sound data, and generates or decodes sound data of operational sounds, sound effects, BGM, and voice communication related to system management of the server system 1100, the game, and the like. The sound generation section 290*s* outputs sound signals related to the system management to the sound output section 390*s*.

The sound output section 390*s* receives the sound signal to emit the corresponding sound. The sound output section 390*s* corresponds to a speaker (not illustrated) included in the main body device or the touch panel 1108 in the example in FIG. 1.

The image generation section 292*s* generates images to be displayed on the image display section 392*s*, and outputs image signals of the images. The image generation section 292*s* corresponds to some of functions to generate screens related to system management of the server system 1100 and various screens related to the game (or data for displaying the screens on the player terminal 1500).

The image display section 392*s* is implemented by devices for displaying images such as a flat panel display, a head-mounted display, or a projector. In the example of FIG. 1, the touch panel 1108 corresponds to the image display section 392*s*.

The communication control section 294*s* performs data processing related to data communication, and implements data exchange with an external device through the communication section 394*s*.

The communication section 394*s* connects to the network 9 to implement communication. For example, the communication section 394*s* is implemented by a wireless communication device, a modem, a terminal adaptor (TA), a jack for wired communication cable, a control circuit, or the like. In the example in FIG. 1, the communication device 1153 corresponds to the communication section 394*s*.

The server storage section 500*s* stores programs and various kinds of data for implementing various functions for causing the server processing section 200*s* to comprehensively control the server system 1100. The server storage section 500*s* is used as a work area for the server processing section 200*s*, and temporarily stores results of calculations executed by the server processing section 200*s* in accordance with various programs. This function is implemented by an IC memory such as a RAM or a ROM, a magnetic disc such as a hard disk, an optical disc such as a CD-ROM or a DVD, an online storage, and the like. In the example of FIG. 1, this function corresponds to the storage media such as the IC memory 1152 and the hard disk included in the main body device and the storage 1140.

Figure 12:
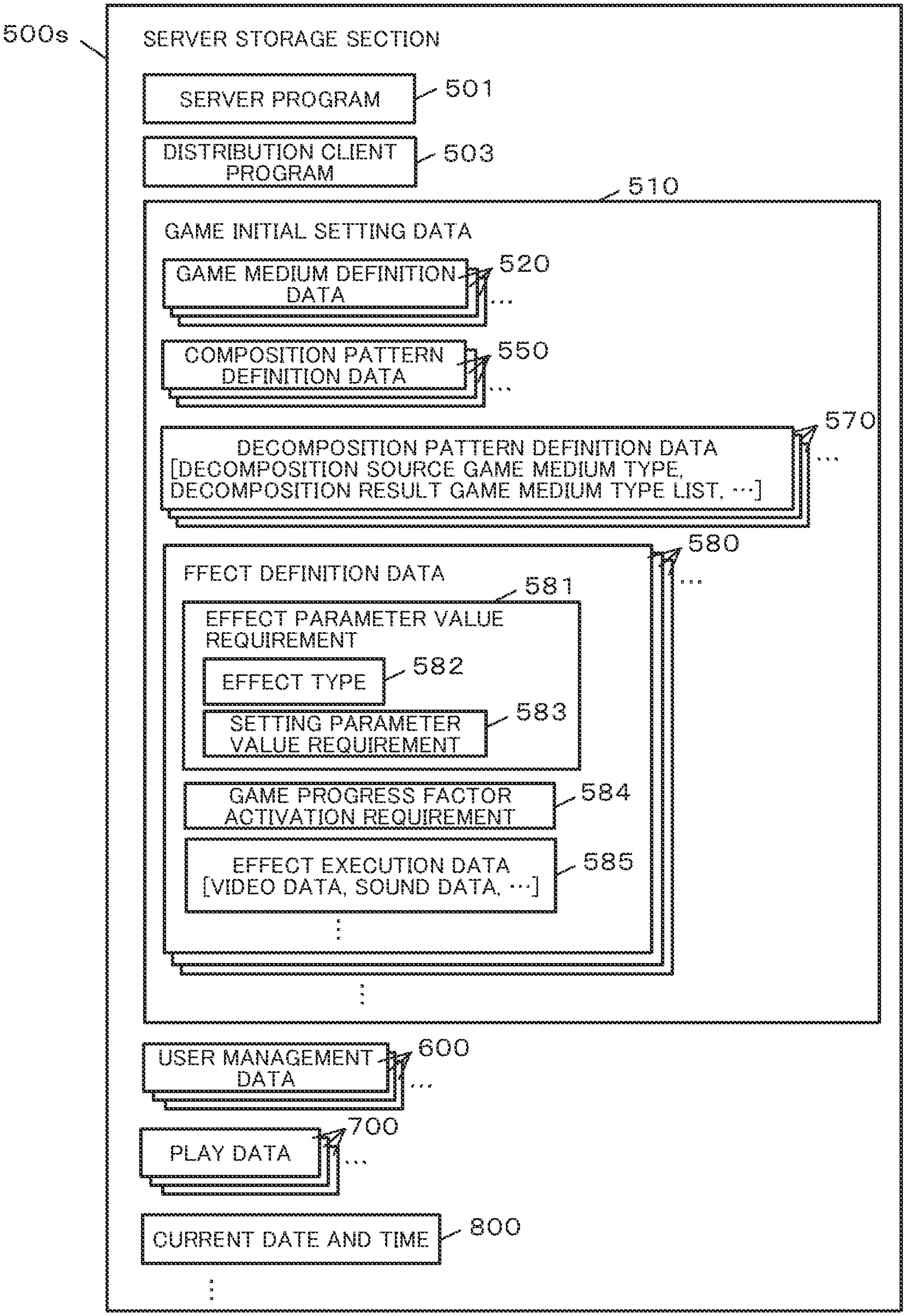
FIG. 12 is a diagram illustrating an example of programs and data stored in a server storage section in the first embodiment.

FIG. 12 is a diagram illustrating an example of the programs and data stored in the server storage section 500*s*. The server storage section 500*s* according to the present embodiment stores a server program 501, a distribution client program 503, and game initial setting data 510.

The server storage section 500*s* stores data, sequentially generated and managed, including user management data 600, play data 700, and current date and time 800. The server storage section 500*s* can also store other programs and data (e.g., a timer, a counter, or various flags) as appropriate.

The server program 501 is read out and executed by the sever processing section 200*s* for implementing functions of the user management section 202, the online shopping management section 206, and the game management section 210.

The distribution client program 503 is an original of a client program that is provided to the player terminal 1500.

The game initial setting data 510 includes various kinds of initial setting data required for execution control of the game.

Specifically, the game initial setting data 510 includes game medium definition data 520, composition pattern definition data 550, decomposition pattern definition data 570, and effect definition data 580. Other types of data can be included as appropriate.

Figure 13:
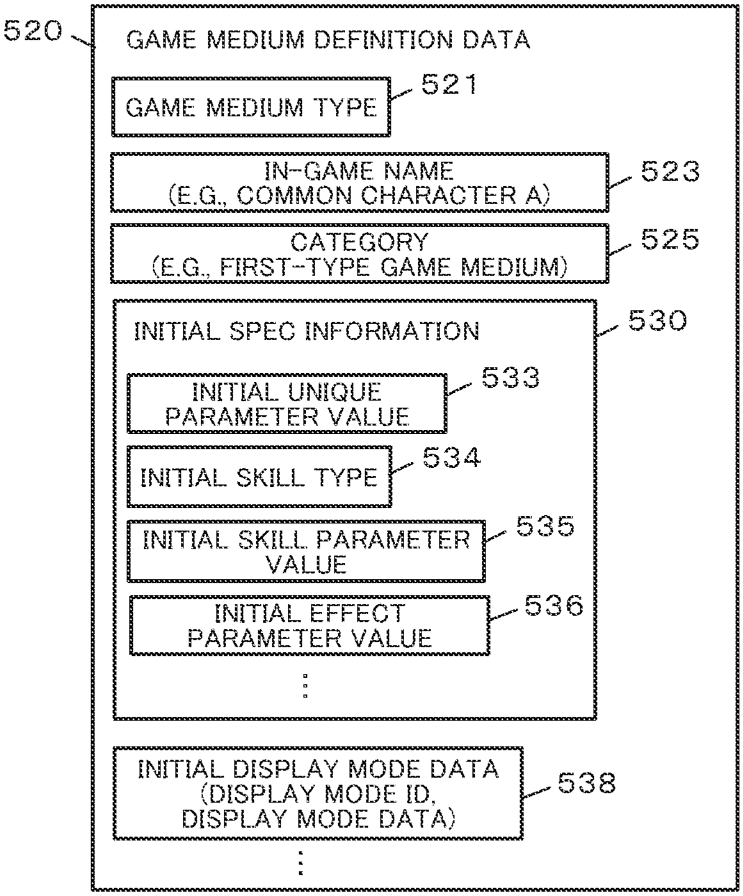
FIG. 13 is a diagram illustrating a data configuration example of game medium definition data.

The game medium definition data 520 contains various kinds of data that is prepared for each type of game media (robot weapon characters in the present embodiment) and defines initial states of the game media. Specifically, as illustrated in FIG. 13, for example, the game medium definition data 520 includes a unique game medium type 521, an in-game name 523, a category 525, initial spec information 530, and initial display mode data 538. Other types of data can be included as appropriate.

The in-game name 523 is the name of the game medium in the game world. That is, the in-game name 523 is the name of a robot weapon.

The category 525 indicates whether the game medium is any of the first-type game medium 11, the second-type game medium 12, the third-type game medium 13, and the fourth-type game medium 14 of the common characters 10 or is the small-fry character 5.

The initial spec information 530 indicates various initial setting values related to the abilities of the game medium. Specifically, the initial spec information 530 includes an initial unique parameter value 533, an initial skill type 534 that is a skill type regarded as having been initially acquired, an initial skill parameter value 535 that is an initial skill parameter value related to a skill indicated by the initial skill type 534, and an initial effect parameter value 536. Other types of data can be included as appropriate.

The initial skill type 534 and the initial skill parameter value 535 are operated in one set. For a game medium initially set with a plurality of skills, a plurality of sets of initial skill types 534 and initial skill parameter values 535 is prepared.

The initial display mode data 538 is data that defines the original display mode initially set to the game medium and contains the unique display mode ID and the display mode data for implementing the display mode (for example, illustrative data of the character, texture data applied to the character model, and the like) in association with each other.

Figure 14:
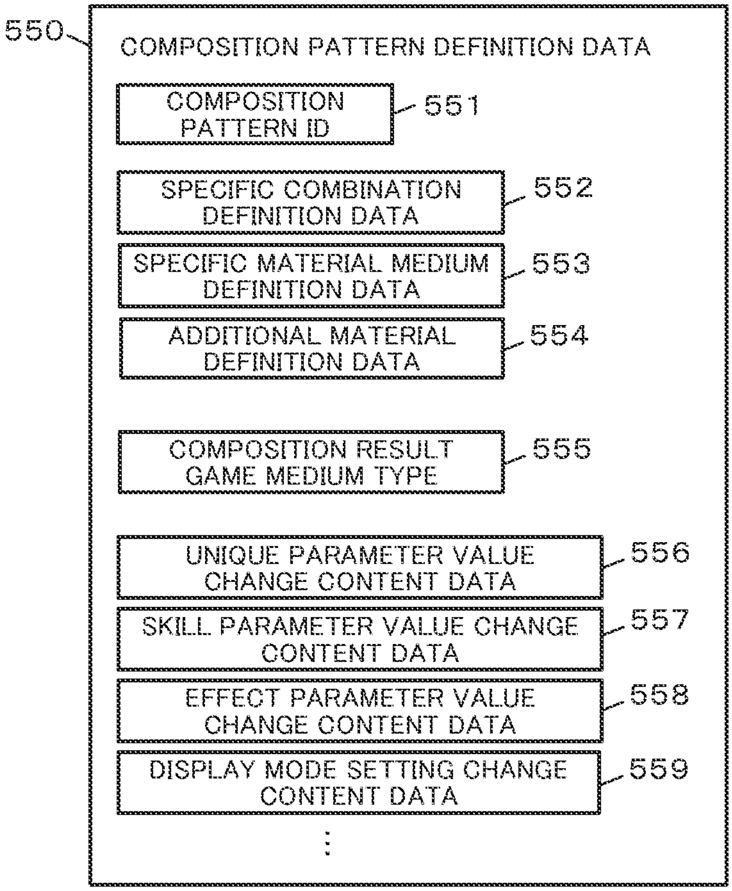
FIG. 14 is a diagram illustrating a data configuration example of composition pattern definition data.

Returning to FIG. 12, the composition pattern definition data 550 is prepared for each composition pattern in the composition function and contains various kinds of data defining the contents of the pattern. For example, as illustrated in FIG. 14, the composition pattern definition data 550 includes a unique composition pattern ID 551, specific combination definition data 552 indicating a specific combination 28, specific material medium definition data 553, additional material definition data 554 indicating a combination of additional materials 29, a composition result game medium type 555, unique parameter value change content data 556, skill parameter value change content data 557, effect parameter value change content data 558, and display mode setting change content data 559. Other types of data can be included as appropriate.

The three types of data, that is, the specific combination definition data 552, the specific material medium definition data 553, and the additional material definition data 554 define a combination of composition materials in the composition pattern of the definition data.

The specific material medium definition data 553 is set to any of the first specific material game medium 21, the second specific material game medium 22, and no setting. The additional material definition data 554 may not be set.

The unique parameter value change content data 556 specifies how to change an initial unique parameter value 533 (see FIG. 13) of the game medium indicated by the composition result game medium type 555. For example, the unique parameter value change content data 556 may be set as appropriate to "summing of parameter values of the same type of the composition materials", "replacement with the maximum value of the parameter values of the same type of the composition materials", "replacement with the minimum value of the parameter values of the same type of the composition materials". "replacement with a specified value", or the like. The unique parameter value change content data 556 may be set with a calculation expression of parameter value.

Similarly, the skill parameter value change content data 557 specifies how to change the initial skill parameter value 535 (see FIG. 13) of the game medium indicated by the composition result game medium type 555. The effect parameter value change content data 558 specifies how to change the initial effect parameter value 536 (see FIG. 13) of the game medium indicated by the composition result game medium type 555.

The display mode setting change content data 559 specifies how to change the initial display mode data 538 (see FIG. 13) of the display mode of the game medium as a composition result. For example, the display mode setting change content data 559 contains the game medium type 521 (see FIG. 13) indicating, if a display mode is to be added (a display mode is to be inherited) at the time of composition, the initial display mode of which game medium is to be added. Alternatively, the display mode setting change content data 559 contains the display mode data to be added itself. If a display mode is to be deleted at the time of composition, the display mode setting change content data 559 specifies how to select the deletion target. Alternatively, the display mode setting change content data 559 contains the information indicating the display mode data to be deleted.

Returning to FIG. 12, the decomposition pattern definition data 570 is prepared for each decomposition pattern of the game medium (see FIG. 3), and contains various kinds of data describing the contents of the pattern. The decomposition pattern definition data 570 contains the types of game media to be decomposed and a decomposition result game medium type list in association with each other.

The effect definition data 580 is prepared for each effect content. The effect definition data 580 includes an effect parameter value requirement 581, a game progress factor activation requirement 584, and effect execution data 585 that is data for executing and realizing the effect. Other types of data can be included as appropriate.

The effect parameter value requirement 581 describes conditions to satisfy for the first effect parameter value 51 to the fourth effect parameter value 54 (see FIG. 5). Specifically, the effect parameter value requirement 581 describes a combination of an effect type condition 582 and a setting parameter value condition 583.

The game progress factor activation requirement 584 describes a condition for the game progress status.

When the effect parameter value requirement 581 and the game progress factor activation requirement 584 are both satisfied, the effect is executed in accordance with the effect execution data 585.

Figure 15:
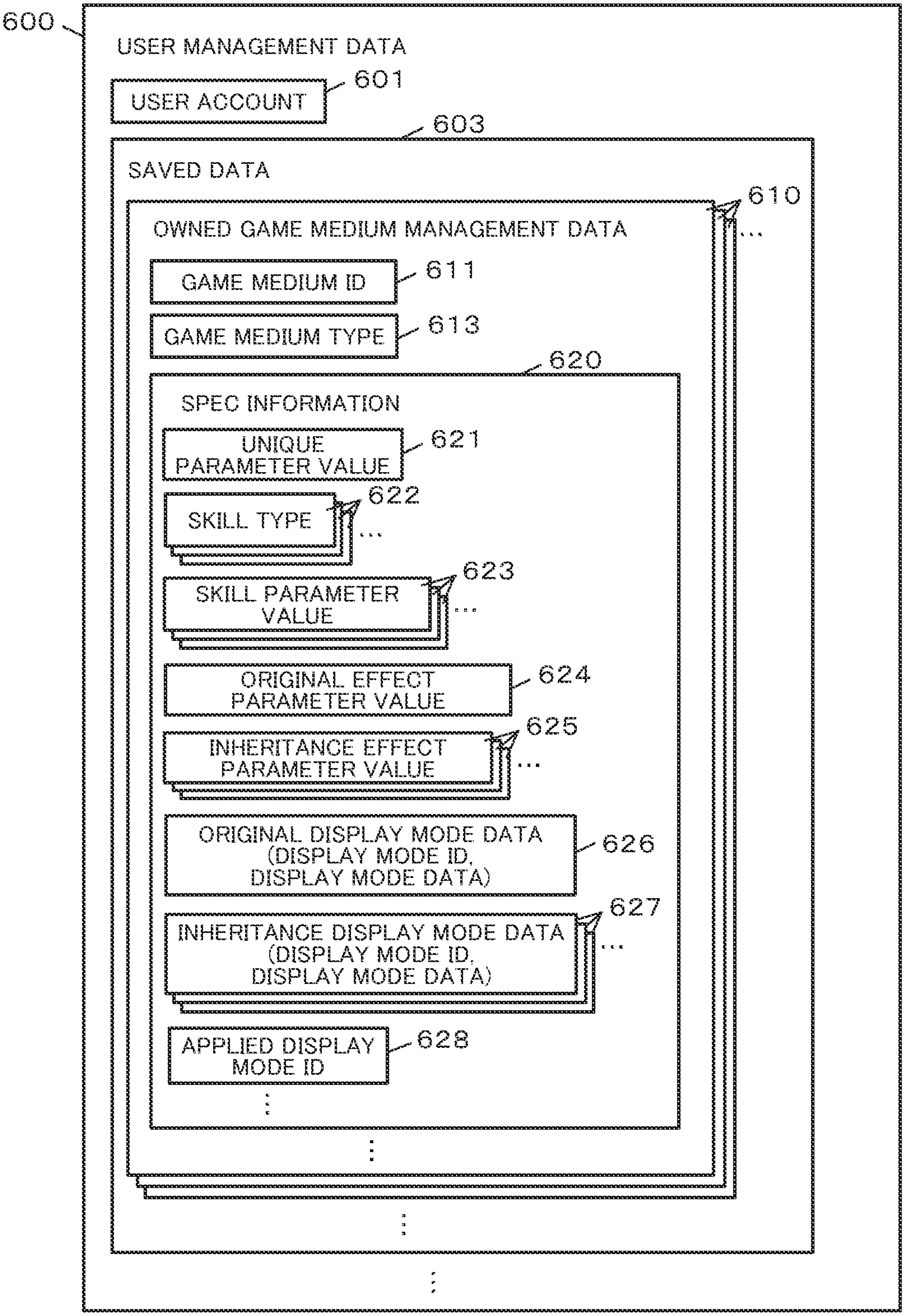
FIG. 15 is a diagram illustrating a data configuration example of user management data.

The user management data 600 is prepared for each user having completed a predetermined registration procedure and contains various kinds of data related to the user. The user management data 600 includes a unique user account 601 and saved data 603, for example, as illustrated in FIG. 15. Other types of data can be included as appropriate.

The saved data 603 is saved data related to the game played by the user as a player, and contains owned game medium management data 610. The owned game medium management data 610 is prepared for each game medium owned by the user (player), and contains various kinds of information related to the game medium.

Specifically, the owned game medium management data 610 includes a unique game medium ID 611, a game medium type 613, and spec information 620. Other types of data can be included as appropriate.

The spec information 620 is a record of various parameter values related to the abilities of the game medium at the saving time, and includes a unique parameter value 621, a skill type 622, a skill parameter value 623, an original effect parameter value 624, an inheritance effect parameter value 625, original display mode data 626, inheritance display mode data 627, and applied display mode ID 628. Other types of data can be included as appropriate.

The skill type 622 and the skill parameter value 623 are provided in one set.

If the game medium is initially set with a skill, the initial skill type 534 and the initial skill parameter value 535 (see FIG. 13) are copied. If a new skill is gained in accordance with the progress of the game, a set for the skill is added.

The original effect parameter value 624 is a copy of the initial effect parameter value 536 (see FIG. 13) of the game medium.

When the game medium inherits an effect by the composition function (see FIG. 7), the initial effect parameter value 536 of the game media as a composition material is copied and added to the inheritance effect parameter value 625.

The original display mode data 626 is a copy of the initial display mode data 538 (see FIG. 13) of the game medium.

If the game medium inherits the display mode, the initial display mode data 538 of the game media as a composition material is copied and added to the inheritance display mode data 627. For the third-type game medium 13, a copy of the initial effect parameter value 536 of the game media derived from the composition materials is added as new inheritance effect parameter value 625 (see FIGS. 10A and 10B).

The applied display mode ID 628 indicates which of the original display mode data 626 and the inheritance display mode data 627 is to be applied to the game medium. This is the result of a selection operation of the display mode to be applied to the game medium by the player 2.

If a new game medium 3 is granted to the player 2, the owned game medium management data 610 is added. In the composition function, the management data of the game media 3 as composition materials is deleted along with the execution of the composition, and the management data of the game medium 3 as a composition result is added. In the decomposition function, the management data of the game medium 3 as a decomposition source is deleted along with the execution of the decomposition, and the management data of the game media 3 as decomposition results is added.

Figure 16:
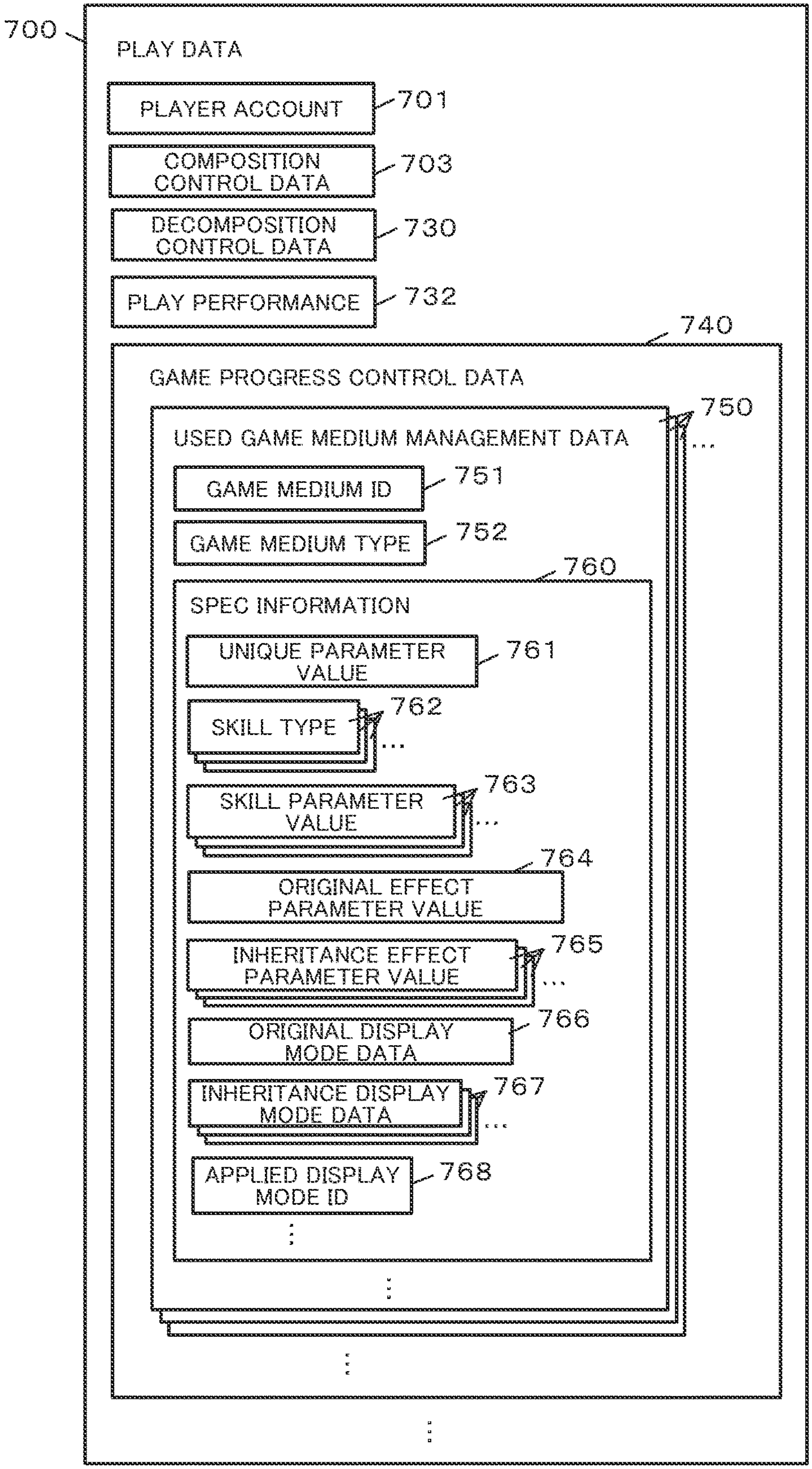
FIG. 16 is a diagram illustrating a data configuration example of play data.

Returning to FIG. 12, the play data 700 is generated for each gameplay, and contains various kinds of data for controlling the progress of the play. One piece of play data 700 includes a player account 701 indicating the user as a player, composition control data 703, decomposition control data 730, play performance 732, and game progress control data 740, for example, as illustrated in FIG. 16. Other types of data can be included as appropriate.

The composition control data 703 contains various types of data related to control of the composition function.

Figure 17:
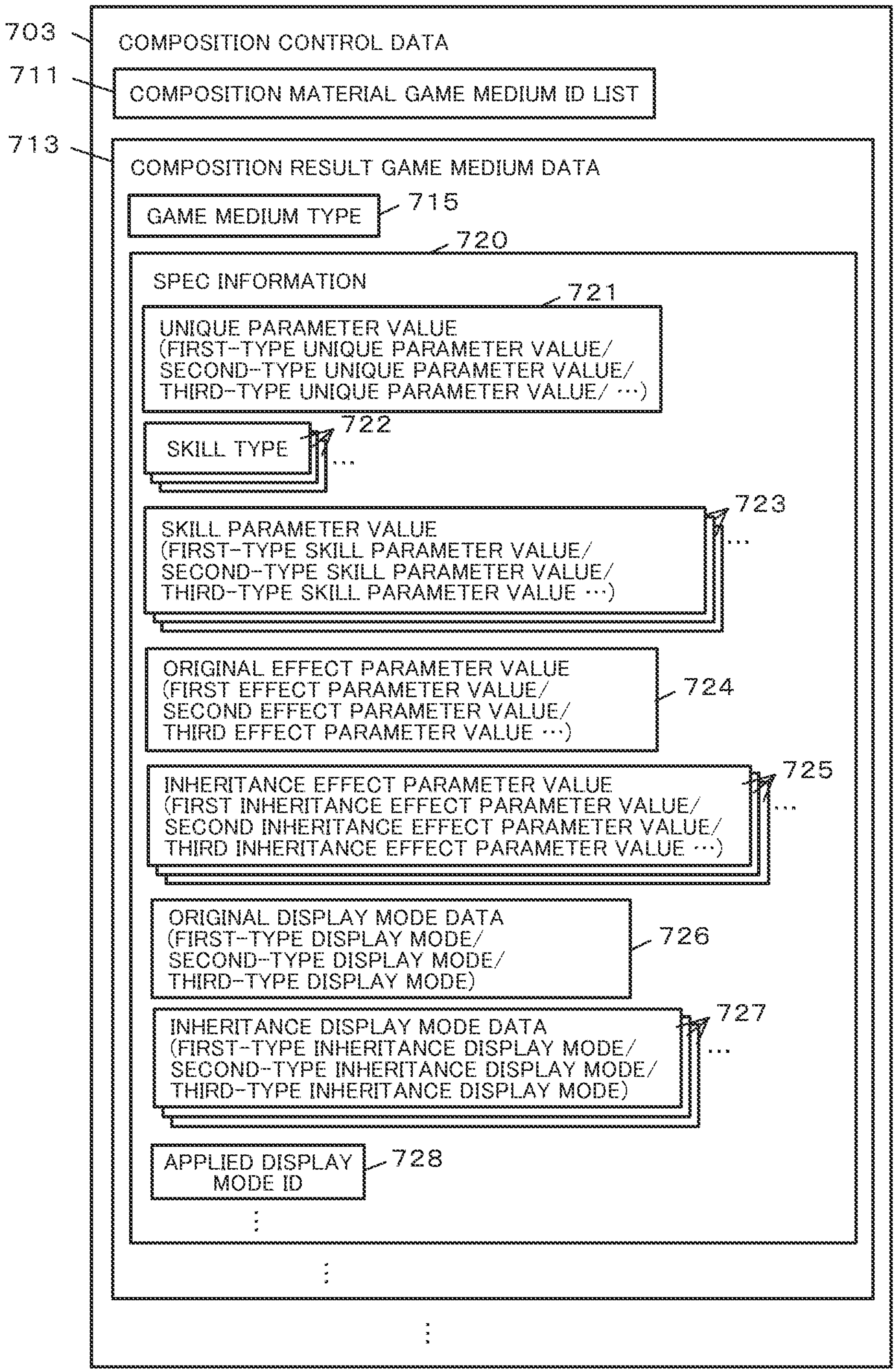
FIG. 17 is a diagram illustrating a data configuration example of composition control data.

The composition control data 703 includes a composition material game medium ID list 711 that is a list of game media 3 as composition materials and composition result game medium data 713, for example, as illustrated in FIG. 17. Other types of data can be included as appropriate.

The composition result game medium data 713 includes a game medium type 715 and spec information 720. The spec information 720 includes a unique parameter value 721, a skill type 722, a skill parameter value 723, an original effect parameter value 724, an inheritance effect parameter value 725, original display mode data 726, inheritance display mode data 727, and an applied display mode ID 728. Other types of data can be included as appropriate.

Returning to FIG. 16, the decomposition control data 730 contains various kinds of data related to control of the decomposition function. For example, the decomposition control data 730 contains the game medium ID of a decomposition source.

The game progress control data 740 contains various kinds of data describing the latest game progress status. For example, the game progress control data 740 includes position and operation control information of various background objects constituting the game space arranged in the virtual space, control information of the virtual camera, position information and operation control information of the player character 4 and an opponent NPC in the game space, game elapsed time, game stage type in the play, and the like. The game progress control data 740 includes used game medium management data 750.

The used game medium management data 750 is prepared for each game medium used in gameplay, and contains various kinds of data describing the latest state of the game medium. For example, the used game medium management data 750 includes a unique game medium ID 751, a game medium type 752, and spec information 760.

Specifically, the spec information 760 includes a unique parameter value 761, a skill type 762, a skill parameter value 763, an original effect parameter value 764, an inheritance effect parameter value 765, original display mode data 766, inheritance display mode data 767, and an applied display mode ID 768. Other types of data can be included as appropriate.

The used game medium management data 750 is copied from the owned game medium management data 610 (see FIG. 15) at the start of the game, and changed as appropriate in accordance with the progress of the game or the execution of the composition function or decomposition function, and the state of end of the game is copied to and saved in the owned game medium management data 610.

Figure 18:
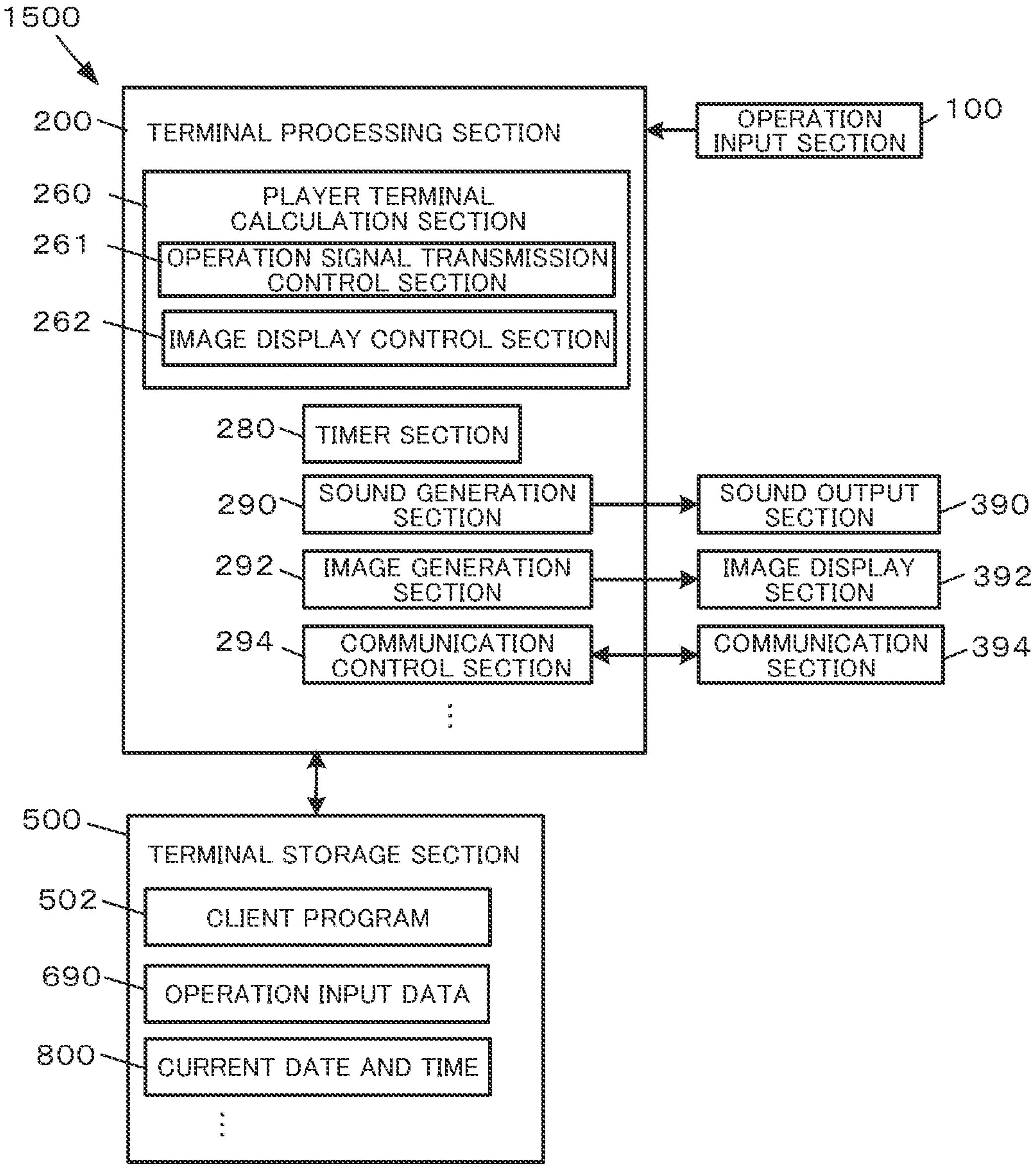
FIG. 18 is a functional block diagram illustrating a functional configuration example of the player terminal in the first embodiment.

FIG. 18 is a functional block diagram illustrating a functional configuration example of the player terminal 1500. The player terminal 1500 includes an operation input section 100, a terminal processing section 200, a sound output section 390, an image display section 392, a communication section 394, and a terminal storage section 500.

The operation input section 100 outputs operation input signals to a terminal processing section 200 in accordance with various operation inputs by the user. The operation input section 100 can be implemented, for example, by a push switch, a joystick, a touch pad, a track ball, an accelerometer, a gyro, or a charge-coupled device (CCD) module. The arrow key 1502, the button switch 1504, and the touch panel 1506 in FIG. 2 corresponds to the operation input section 100.

The terminal processing section 200 is implemented, for example, by a microprocessor such as a CPU or a GPU and electronic components such as an IC memory. The terminal processing section 200 controls input/output of data between the functional sections including the operation input section 100 and the terminal storage section 500. The terminal processing section 200 performs various calculation processes based on a predetermined program or data, operation input signals from the operation input section 100, and various kinds of data received from the server system 1100 to control operations of the player terminal 1500. The control board 1550 in FIG. 2 corresponds to the terminal processing section 200.

The terminal processing section 200 in the present embodiment includes a player terminal calculation section 260, a timer section 280, a sound generation section 290, an image generation section 292, and a communication control section 294.

The player terminal calculation section 260 controls the player terminal 1500 to function as a client device that communicates with the server system 1100. Specifically, the player terminal calculation section 260 includes an operation signal transmission control section 261 and an image display control section 262.

The operation signal transmission control section 261 performs a process of transmitting various kinds of data and requests to the server system 1100 in accordance with an operation performed on the operation input section 100.

The image display control section 262 performs a control for displaying a game screen and various operation screens based on various kinds of data received from the server system 1100.

The timer section 280 uses a system clock to measure a current date and time, a limited time period, or the like.

The sound generation section 290 is implemented, for example, by a processor such as a digital signal processor (DSP) or a sound synthesizing IC, or an audio codec capable of playing a sound file. The sound generation section 290 generates sound signals for music, sound effects, or various kinds of operational sounds, and outputs the signals to the sound output section 390.

The sound output section 390 is implemented by a device that outputs (emits) sounds based on the sound signals input from the sound generation section 290. The speaker 1510 in FIG. 2 corresponds to the sound output section 390.

The image generation section 292 generates images, composites images, and outputs image signals for displaying these images on the image display section 392, based on the results of processing by the image display control section 262. In the example of FIG. 2, the graphics processing unit (GPU) and graphic controller mounted on the control board 1550 correspond to the image generation section 292.

The image display section 392 is implemented by a device for displaying images such as a flat panel display, a head-mounted display, or a projector. In the example of FIG. 2, the touch panel 1506 corresponds to the image display section 392.

The communication control section 294 performs data processing related to data communication, and implements data exchange with an external device through the communication section 394.

The communication section 394 connects to the network 9 to implement communication. For example, the communication section 394 is implemented by a wireless communication device, a modem, a terminal adaptor (TA), a jack for wired communication cable, a control circuit, or the like. In the example of FIG. 2, the wireless communication module 1553 corresponds to these components.

In the present embodiment, the server system 1100 generates the images of the game screen and various screens. Alternatively, the player terminal 1500 may be configured to generate these images. In this case, the image display control section 262 controls, for example, objects arranged in a virtual three-dimensional space for generating 3DCG, and the image generation section 292 renders the 3DCG and executes various controls for generating the game screen.

The terminal storage section 500 stores programs and various kinds of data for causing the terminal processing section 200 to implement given functions. The terminal storage section 500 is also used as a work area for the terminal processing section 200, and temporarily stores results of calculations executed by the terminal processing section 200 in accordance with various programs, input data input from the operation input section 100, or the like. These functions are implemented by an IC memory such as a RAM or a ROM, a magnetic disk such as a hard disk, an optical disc such as a CD-ROM or a DVD. In the example of FIG. 2, the IC memory 1552 included in the control board 1550 and the memory card 1540 corresponds to the terminal storage section 500. The terminal storage section 500 may be implemented by an online storage.

Specifically, the terminal storage section 500 records a client program 502 for causing the terminal processing section 200 to function as the player terminal calculation section 260, operation input data 690, and current date and time 800. Note that other types of data can be stored as appropriate.

Next, operations of the game system 1000 will be described.

Figure 19:
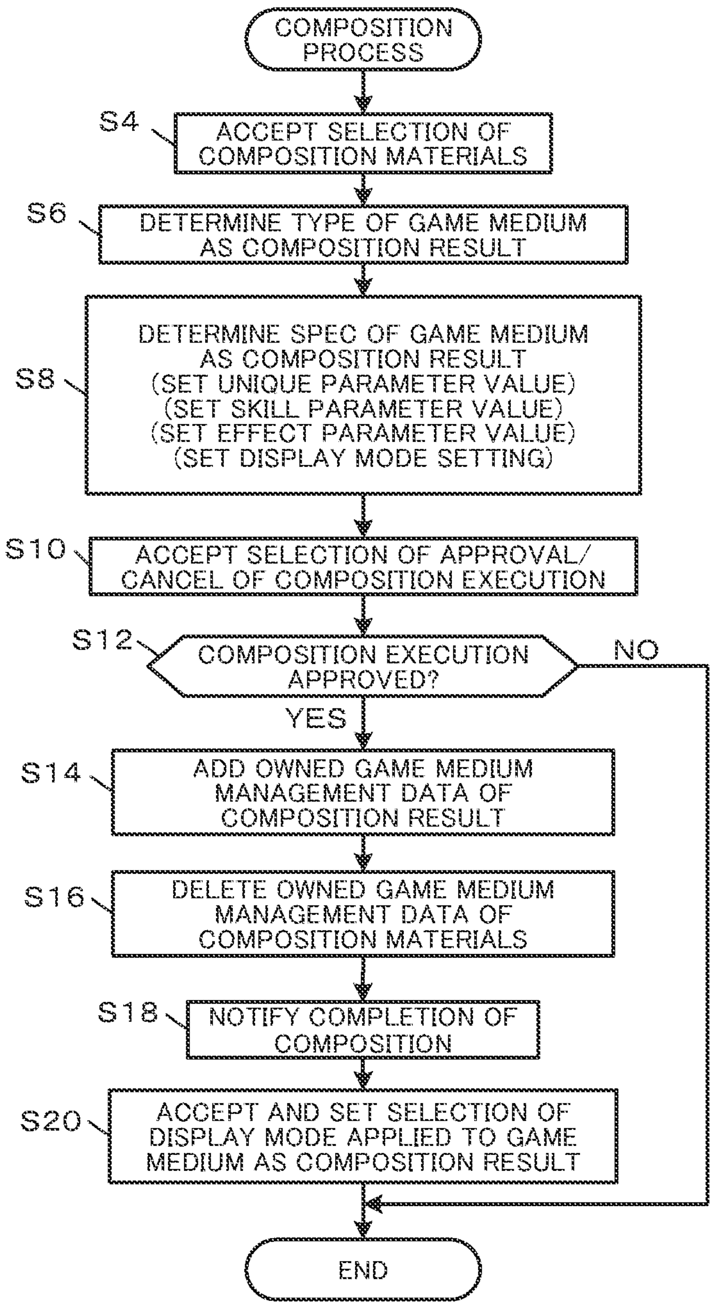
FIG. 19 is a flowchart for describing a flow of a composition process.

FIG. 19 is a flowchart for describing a flow of a composition process executed by the server system 1100. The process is executed when an input of a predetermined composition start operation is detected at an arbitrary timing such as before the start of gameplay or the end of the game.

The server system 1100 first accepts a selection of game media as composition materials, and sets the selection to the composition material game medium ID list 711 (see FIG. 17) (step S4).

Then, the server system 1100 determines the type of the game medium as a composition result (step S6). Specifically, the server system 1100 searches the composition pattern definition data 550 (see FIG. 14) for definition data including the specific combination definition data 552, the specific material medium definition data 553, and the additional material definition data 554 matching the composition materials accepted in step S4, and sets the composition result game medium type 555 to the game medium type 715 of the composition result game medium data 713.

Then, the server system 1100 sets the spec of the game medium as a composition result (step S8). Specifically, the server system 1100 copies the initial spec information 530 from the game medium definition data 520 (see FIG. 13) corresponding to the game medium type 715 to the spec information 720 of the composition result game medium data 713. The server system 1100 changes the initial settings of the spec information 720 in accordance with the unique parameter value change content data 556, the skill parameter value change content data 557, the effect parameter value change content data 558, and the display mode setting change content data 559 of the composition pattern definition data 550 (see FIG. 14) matching the composition materials searched for in step S6. Accordingly, the game medium as a composition result is prepared, where the contents illustrated in FIGS. 6 to 10 are applied in the composition function.

Then, the server system 1100 accepts an input of selection of approval/cancel of composition execution from the player 2 (step S10). At this time, the information of the prepared composition result may be partially or entirely disclosed to the player 2 so that the player 2 can check the current composition contents.

Upon detection of an input of an operation for approving the execution of composition (YES in step S12), the server system 1100 adds the owned game medium management data 610 of the game medium as a composition result (see FIG. 15) to the user management data 600 of the player 2 (step S14), and deletes the owned game medium management data 610 of the game media as the composition materials (step S16). The server system 1100 then notifies the completion of the composition to the player 2 on the player terminal 1500 (step S18).

If there is the inheritance display mode data 627 (see FIG. 15) for the game medium as the composition result, the server system 1100 presents the data to the player 2, accepts an operation of selection of the display mode to be applied to the game medium, and sets the applied display mode ID 628 (see FIG. 15) (step S20). Then, the server system 1100 ends the composition process.

Figure 20:
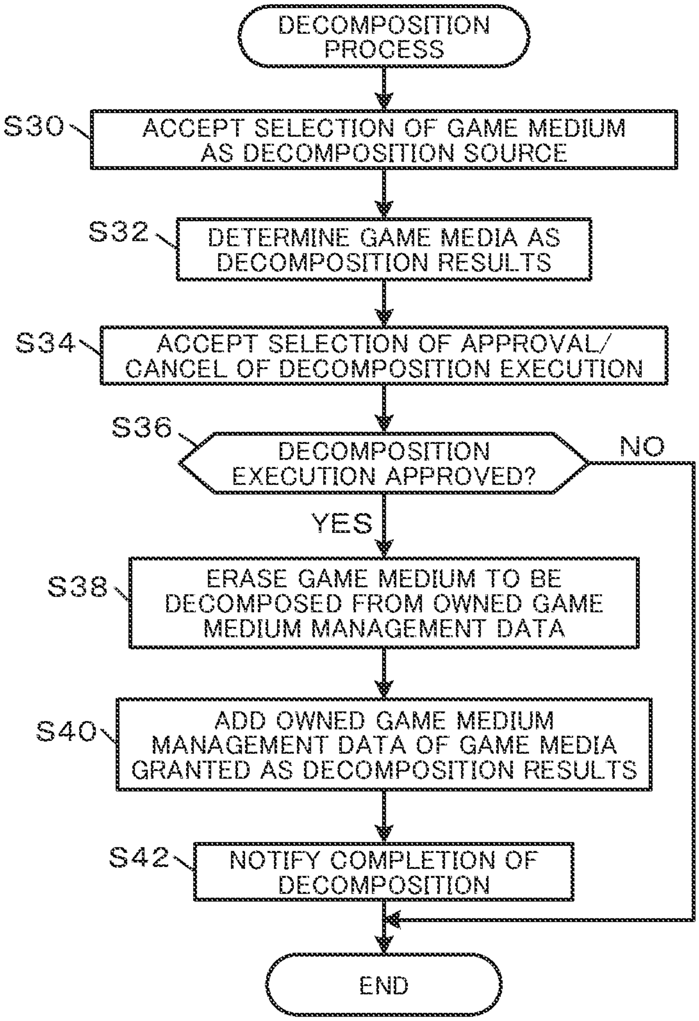
FIG. 20 is a flowchart for describing a flow of a decomposition process.

FIG. 20 is a flowchart for describing a flow of a decomposition process executed by the server system 1100. The process is executed when an input of a predetermined decomposition start operation is detected at an arbitrary timing such as before the start of gameplay or after the end of the game.

The server system 1100 accepts an input of selection of the game medium as decomposition source (step S30). For example, the server system 1100 displays a list of all game media owned by the player 2 at this point of time on the player terminal 1500 and accepts an operation of specifying or selecting any of them. For display of the list, the display modes indicated by the applied display mode IDs 632 are applied to the display modes of the game media, and simple indications of the specs (for example, icons for the types of the specs, star marks or bar graphs indicating the levels of the specs) are added.

The server system 1100 then refers to the decomposition pattern definition data 570 (see FIG. 12) to determine the game media to be granted as decomposition results (step S32).

Then, the server system 1100 accepts an input of selection of approval/cancel of decomposition execution from the player 2 (step S34). At this time, the information on the game media as decomposition results determined in step S32 may be partially or entirely disclosed to the player 2 so that the player 2 can check the estimated results of the decomposition.

If detecting an input of an operation of approving the execution of the decomposition (YES in step S36), the server system 1100 erases the owned game medium management data 610 of the game medium as the decomposition source (step S38), and adds new owned game medium management data 610 of the game media as the decomposition results (step S40).

The server system 1100 then notifies the completion of the decomposition on the player terminal 1500 (step S42), and ends the decomposition process.

Figure 21:
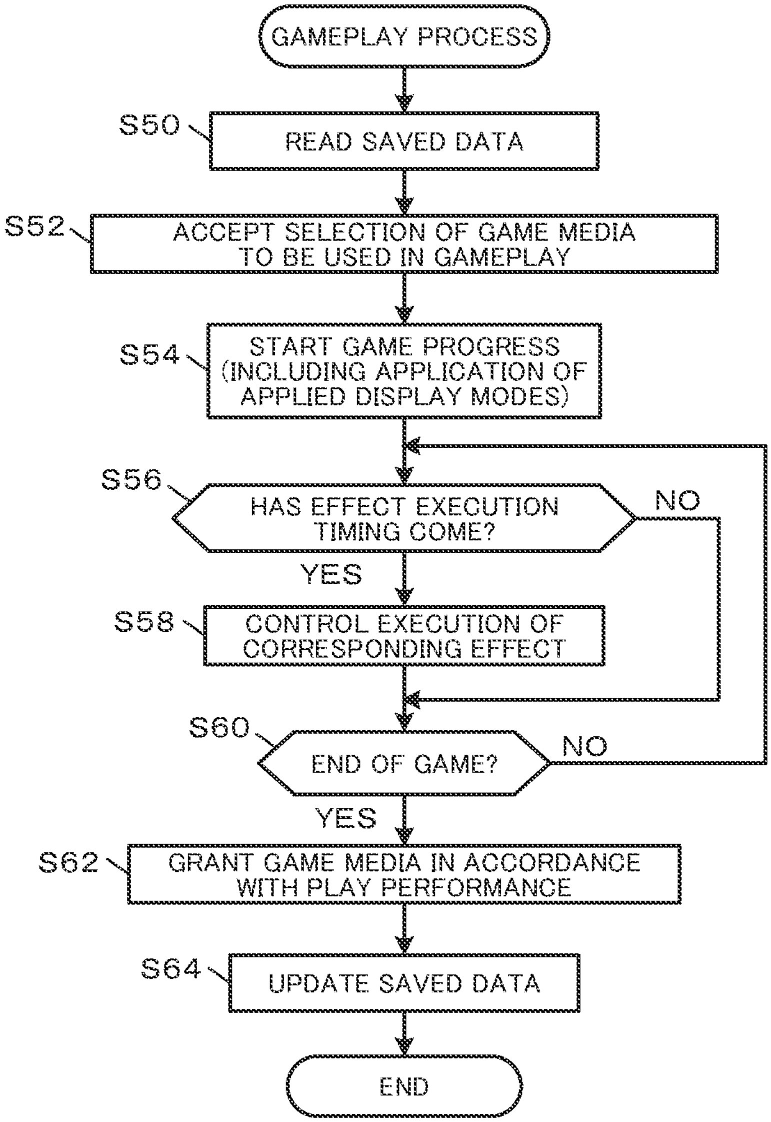
FIG. 21 is a flowchart for describing a flow of a gameplay process.

FIG. 21 is a flowchart for describing a flow of a gameplay process. This process is executed when an input of a predetermined play start operation is detected at the player terminal 1500.

In this process, the server system 1100 first refers to the saved data 603 (step S50), and accepts a selection of game media to be used in gameplay as a player character 4 (see FIG. 3) (step S52). For example, the server system 1100 displays a list of all the game media owned on the player terminal 1500, and accepts an operation of specifying or selecting any of them. For display of the list, the display modes indicated by the applied display mode IDs 768 are applied to the display modes of the game media, and simple indications of the specs are added.

If the game media to be used are selected, the server system 1100 starts a game progress control (step S54). The display modes indicated by the applied display mode IDs 768 are applied to the player character 4 displayed on the game screen, and simple indications of respective specs of the display modes are added.

During the progress of the game, the server system 1100 monitors the coming of an effect execution timing related to the player character 4.

Specifically, the server system 1100 refers to the effect definition data 580 (see FIG. 12) indicated by the original effect parameter value 764 and the inheritance effect parameter value 765 (see FIG. 16) of the player character 4, determines whether the effect parameter value requirement 581 and the game progress factor activation requirement 584 are both satisfied. If the determination result is affirmative, the server system 1100 determines that the effect execution timing has come.

When determining that the effect execution timing has come (YES in step S56), the server system 1100 executes the execution control of the corresponding effect (step S58).

Steps S56 and S58 are repeated until the end of the game.

If the game is ended (YES in step S60), the server system 1100 grants new game media 3 to the player 2 in accordance with the play performance (step S62), updates the saved data 603 (step S64), and ends the gameplay process.

In order to enable the composition function even during gameplay, the gameplay process may be provided with a step of determination on the detection of a composition start operation so that if an affirmative determination is made in this step, the server system 1100 will execute the composition process (see FIG. 19).

Similarly, in order to enable the decomposition function even during gameplay, the gameplay process may be provided with a step of determination on the detection of a decomposition start operation so that if an affirmative determination is made in this step, the server system 1100 will execute the decomposition process (see FIG. 20).

As a result, in the present embodiment, in the game with the composition function of compositing game media associated with a character and the decomposition function of decomposing a game medium into a plurality of game media, the game system 1000 can add new game enjoyment to enhance the possibility of the player continuing the game.

Second Embodiment

Next, a second embodiment will be described. When the second embodiment is compared to the first embodiment, there is a difference in that the game management functions are implemented by the server system 1100 in the first embodiment, whereas game management is implemented by a player terminal 1500B in the second embodiment. The following mainly describes differences from the first embodiment. Components that are the same as those in the first embodiment are denoted with the same referential numerals, and duplicate description will be omitted.

Figure 22:
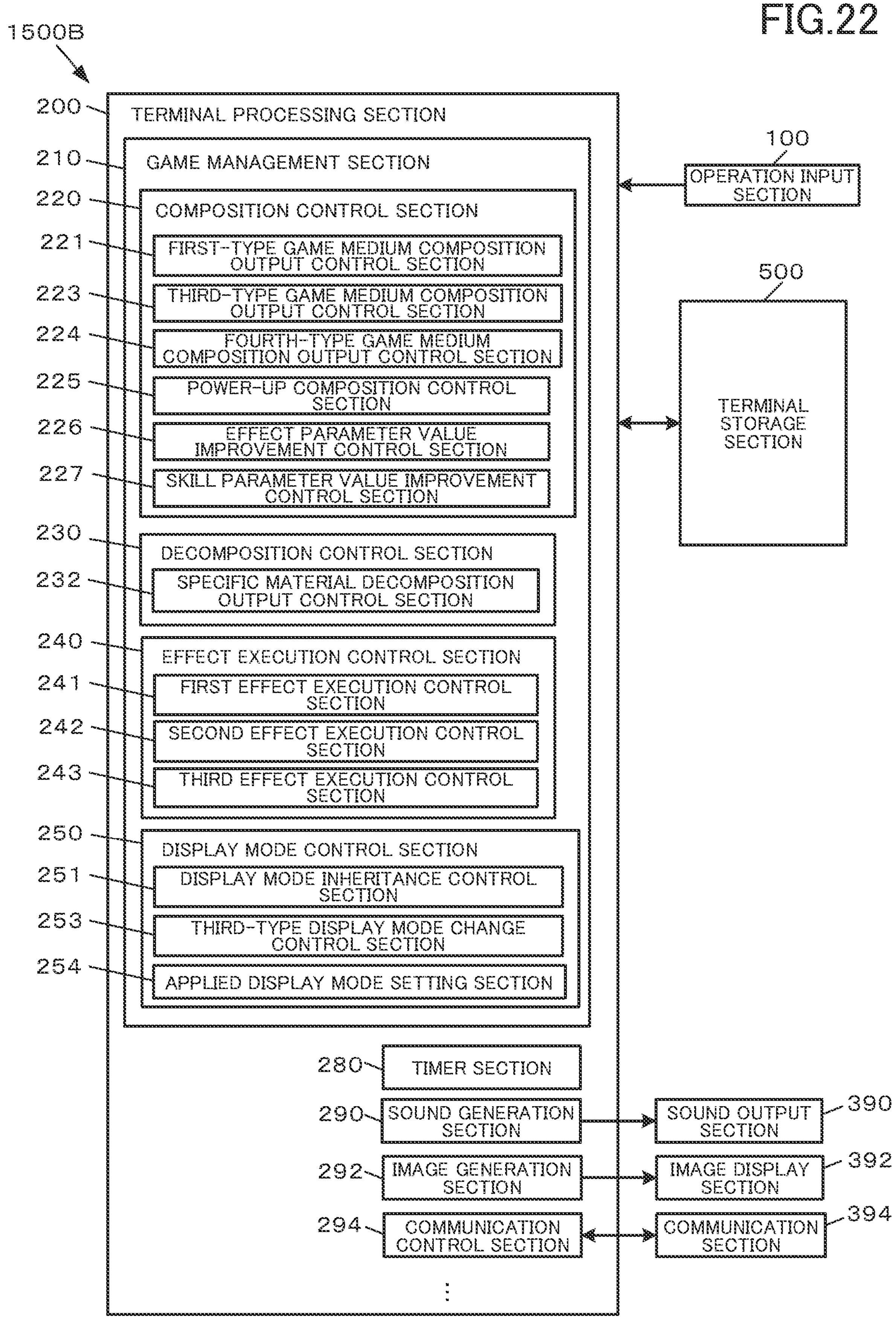
FIG. 22 is a functional block diagram illustrating a functional configuration example of a player terminal in a second embodiment.

FIG. 22 is a functional block diagram illustrating a functional configuration example of the player terminal 1500B in the present embodiment. The player terminal 1500B in the present embodiment has a game management section 210 instead of the player terminal calculation section 260 in the first embodiment.

Figure 23:
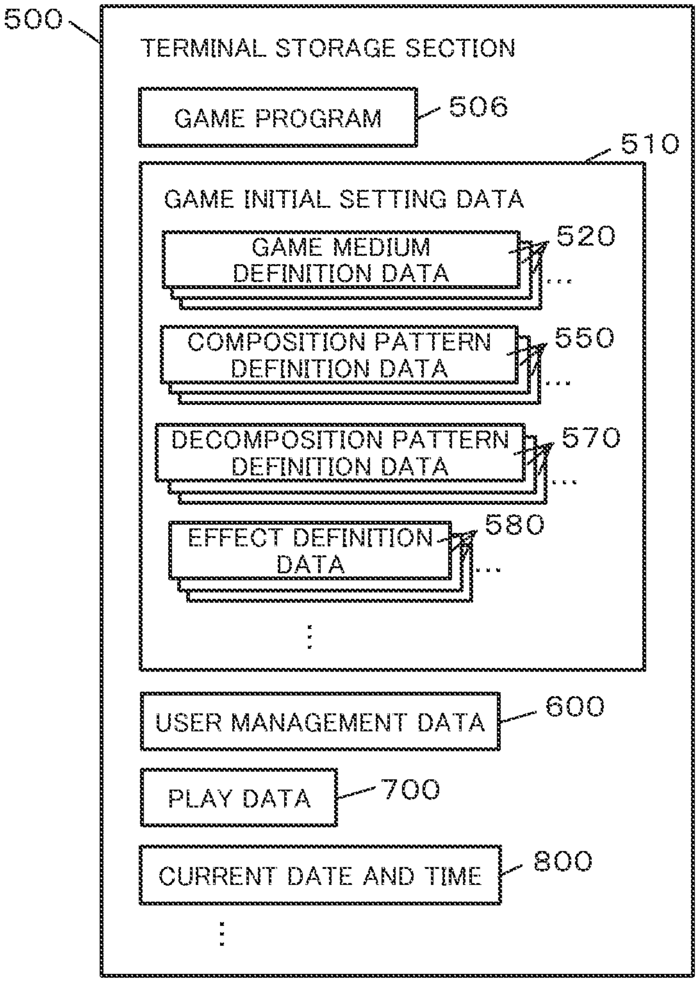
FIG. 23 is a diagram illustrating an example of programs and data stored in a terminal storage section in the second embodiment.

A terminal storage section 500 in the present embodiment stores, as illustrated in FIG. 23, a game program 506, game initial setting data 510, user management data 600 of a player 2 having the player terminal 1500B, play data 700, and current date and time 800.

The game program 506 is stored instead of the client program 502. When the program is executed, a terminal processing section 200 functions as the game management section 210.

The game initial setting data 510 may be downloaded in advance from the server system 1100, or necessary data from the first effect parameter value 510 may be acquired as appropriate through issuance of a request to the server system 1100 as reference is required.

Similarly, the user management data 600 may be managed in the server system 1100 as in the first embodiment, so that the player terminal 1500 requests the server system 1100 to read or write the data included in the user management data 600 as required.

A flow of process in the player terminal 1500B in the present embodiment is similar to the flow of the process in the server system 1100 in the first embodiment. That is, the execution of the process by the server system 1100 in the first embodiment can be replaced with the execution of the process by the player terminal 1500B in the second embodiment.

The present embodiment can provide the same advantageous effects as those of the first embodiment.

MODIFICATION EXAMPLES

The embodiments to which the present disclosure is applied are described so far. However, the modes to which the present disclosure is applicable are not limited to the above-described embodiments, and the components can be added, omitted, or changed as appropriate.

For example, the server system 1100 has the functions of the game management section 210 in the first embodiment, and the player terminal 1500B has the functions of the game management section 210 in the second embodiment. Otherwise, the intermediate configuration is possible. That is, based on the first embodiment, some of the functions of the game management section 210 may be performed by the player terminal 1500. In reverse, based on the second embodiment, some of the functions of the game management section 210 may be performed by the server system 1100.

Although only some embodiments of the present disclosure have been described in detail above, those skilled in the art will readily appreciate that many modifications are possible in the embodiments without materially departing from the novel teachings and advantages of this disclosure. Accordingly, all such modifications are intended to be included within scope of this disclosure.

What is claimed is:

1. A computer system comprising:

at least one processor or circuit programmed to execute:

controlling execution of a game in which a character uses an associated game medium;

performing a composition control of compositing a plurality of game media into the game medium; and performing a decomposition control of decomposing the game medium into a plurality of the game media, wherein a first-type game medium, a second-type game medium, and a third-type game medium are each particular attributes of a predetermined common character, the third-type game medium has a higher ability of the common character exerted at time of use in the game than the first-type game medium, the second-type game medium is a game medium incapable of being obtained by composition in the composition control, the composition control includes, in a case of performing composition using a specific combination of the game media, outputting the first-type game medium as a composition result for the predetermined common character, the decomposition control includes, in a case of decomposing the first-type game medium of the predetermined common character, outputting a plurality of game media including a first specific material game medium, the decomposition control includes, in a case of decomposing the second-type game medium of the predetermined common character, outputting a plurality of game media including a second specific material game medium identical to or different from the first specific material game medium, and the composition control includes, in both cases of performing composition using the game media in the specific combination and the first specific material game medium, and performing composition using the game media in the specific combination and the second specific material game medium, outputting the same third-type game medium as a composition result for the predetermined common character.

2. The computer system as defined in claim 1, wherein the first-type game medium is set with a first-type unique parameter value unique to the first-type game medium, the second-type game medium is set with a second-type unique parameter value unique to the second-type game medium, the third-type game medium is set with a third-type unique parameter value unique to the third-type game medium, the composition control includes, only in a case of performing composition using the first-type game medium, outputting a new first-type game medium with improvement in the first-type unique parameter value, as a composition result, the composition control includes, only in a case of performing composition using the second-type game media, outputting a new second-type game medium with improvement in the second-type unique parameter value, as a composition result, and the composition control includes, only in a case of performing composition using the third-type game media, outputting a new third-type game medium with improvement in the third-type unique parameter value, as a composition result.

3. The computer system as defined in claim 1, wherein the composition control includes, in a case of performing composition using the second-type game medium and the third-type game medium, outputting a fourth-type game medium associated with the common character as a composition result, the fourth-type game medium being capable of executing a second effect associated with the second-type game medium and a third effect associated with the third-type game medium.

4. The computer system as defined in claim 1, wherein the at least one processor or circuit is further programmed to execute:

performing a first effect execution control of executing a first effect if the first-type game medium is used in gameplay;

performing a second effect execution control of executing a second effect different from the first effect if the second-type game medium is used in gameplay; and performing a third effect execution control of executing a third effect different from the first effect and the second effect if the third-type game medium is used in gameplay, and (1) executing the first effect if the first specific material game medium is used as a composition material of the third-type game medium, and (2) executing the second effect if the second specific material game medium is used as a composition material of the third-type game medium.

5. The computer system as defined in claim 4, wherein the first-type game medium is set with a first effect parameter value for the first effect, the second-type game medium is set with a second effect parameter value for the second effect, the third-type game medium is set with a third effect parameter value for the third effect, the composition control includes, only in a case of performing composition using the first-type game medium, outputting a new first-type game medium with improvement in the first effect parameter value, as a composition result, the composition control includes, only in a case of performing composition using the second-type game media, outputting a new second-type game medium with improvement in the second effect parameter value, as a composition result, and the composition control includes, only in a case of performing composition using the third-type game media, outputting a new third-type game medium with improvement in the third effect parameter value, as a composition result.

6. The computer system as defined in claim 4, wherein the first to third effects are at least one of play control of a given video, output control of a given sound, and play control of a given character motion.

7. The computer system as defined in claim 1, wherein the first-type game medium is not set with a skill unique to the first-type game medium or is set with a first-type skill and a first-type skill parameter value, the second-type game medium is set with a second-type skill and a second-type skill parameter value unique to the second-type game medium, the third-type game medium is set with a third-type skill and a third-type skill parameter value unique to the third-type game medium, the composition control includes, only in a case of performing composition using the second-type game media, outputting a new second-type game medium with improvement in the second-type skill parameter value as a composition result, and the composition control includes, only in a case of performing composition using the third-type game media, outputting a new third-type game medium with improvement in the third-type skill parameter value as a composition result.

8. The computer system as defined in claim 1, wherein the third-type game medium has a plurality of subtypes of third-type game media associated with the common character, and the composition control includes outputting the subtypes of third-type game media as a composition result, in accordance with the specific combination of the game media, the first specific material game medium or the second specific material game medium, and the game media to be combined in the composition.

9. The computer system as defined in claim 1, wherein the first-type game medium is set with a first-type display mode based on the common character as a display mode of the game medium, the second-type game medium is set with a second-type display mode based on the common character as a display mode of the game medium, the third-type game medium is set with a third-type display mode based on the common character as a display mode of the game medium, and the at least one processor or circuit is further programmed to execute performing a third-type display mode change control of allowing the display mode of the third-type game medium to be changed to (1) the first-type display mode if the first specific material game medium is used as a composition material of the third-type game medium, and to be changed to (2) the second-type display mode if the second specific material game medium is used as a composition material of the third-type game medium.

10. The computer system as defined in claim 1, wherein the at least one processor or circuit is further programmed to execute managing information on the game media owned by each player.

11. A game system comprising:

a server system that is the computer system as defined in claim 10; and a player terminal of each player.

12. A game medium control method comprising:

by a computer system, controlling execution of a game in which a character uses an associated game medium;

by the computer system, performing a composition control of compositing a plurality of game media into the game medium; and by the computer system, performing a decomposition control of decomposing the game medium into a plurality of the game media, wherein a first-type game medium, a second-type game medium, and a third-type game medium are each particular attributes of a predetermined common character, the third-type game medium has a higher ability of the common character exerted at time of use in the game than the first-type game medium, the second-type game medium is a game medium incapable of being obtained by composition in the composition control, the composition control includes, in a case of performing composition using a specific combination of the game media, outputting the first-type game medium as a composition result for the predetermined common character, the decomposition control includes, in a case of decomposing the first-type game medium of the predetermined common character, outputting a plurality of game media including a first specific material game medium, the decomposition control includes, in a case of decomposing the second-type game medium of the predetermined common character, outputting a plurality of game media including a second specific material game medium identical to or different from the first specific material game medium, and the composition control includes, in both cases of performing composition using the game media in the specific combination and the first specific material game medium, and performing composition using the game media in the specific combination and the second specific material game medium, outputting the same third-type game medium as a composition result for the predetermined common character.

* * * * *